(12) United States Patent
Hill

(10) Patent No.: US 10,742,683 B2
(45) Date of Patent: Aug. 11, 2020

(54) NETWORK ASSET CHARACTERIZATION, CLASSIFICATION, GROUPING AND CONTROL

(71) Applicant: Veracity Security Intelligence, Inc., Aliso Viejo, CA (US)

(72) Inventor: Roger Hill, Aliso Viejo, CA (US)

(73) Assignee: Veracity Industrial Networks, Inc., Aliso Viejo, CA (US)

(*) Notice: Subject to any disclaimer, the term of this patent is extended or adjusted under 35 U.S.C. 154(b) by 105 days.

(21) Appl. No.: 15/708,018

(22) Filed: Sep. 18, 2017

(65) Prior Publication Data
US 2019/0089741 A1  Mar. 21, 2019

(51) Int. Cl.
*H04L 29/06* (2006.01)
*G06F 21/44* (2013.01)

(52) U.S. Cl.
CPC .......... *H04L 63/20* (2013.01); *H04L 63/0428* (2013.01); *H04L 63/0471* (2013.01); *H04L 63/0876* (2013.01); *G06F 21/44* (2013.01)

(58) Field of Classification Search
CPC ............. H04L 63/0272; H04L 63/0281; H04L 63/0471; H04L 63/0876; H04L 63/20; G06F 21/44
See application file for complete search history.

(56) References Cited

U.S. PATENT DOCUMENTS

| 2005/0039040 A1 | 2/2005 | Ransom | |
| 2006/0130135 A1* | 6/2006 | Krstulich | H04L 12/4679 726/15 |
| 2012/0144187 A1* | 6/2012 | Wei | H04L 63/0281 713/152 |
| 2014/0282976 A1* | 9/2014 | Holmelin | H04L 63/08 726/7 |
| 2016/0087958 A1* | 3/2016 | Luo | H04L 63/0209 713/168 |
| 2017/0026349 A1* | 1/2017 | Smith | H04L 63/0471 |
| 2017/0126623 A1 | 5/2017 | Lindteigen | |
| 2017/0214717 A1* | 7/2017 | Bush | H04L 63/107 |
| 2017/0302624 A1* | 10/2017 | Persson | H04L 12/4633 |

(Continued)

FOREIGN PATENT DOCUMENTS

WO   20131193371   8/2013

OTHER PUBLICATIONS

Mahan et al. Secure Data Transfer Guidance for Industrial Control and SCADA Systems Sep. 2011 U.S. Department of Energy (Year: 2011).*

(Continued)

*Primary Examiner* — David J Pearson

(57) ABSTRACT

Techniques applicable to a network orchestration and security platform for a network, such as an industrial control system (ICS) network, are disclosed. Such techniques include, for example, methods to characterize and classify networked industrial devices based upon conversation patterns, generate security zones for ICS networked assets based upon conversation characteristics and patterns, to identify and record ICS networked devices in a non-intrusive way, to create secure conduits between security zones for ICS networked devices with no impact to endpoint hose devices, and systems therefor.

20 Claims, 22 Drawing Sheets

(56) References Cited

U.S. PATENT DOCUMENTS

2018/0048550 A1\* 2/2018 Beyah .................... G06F 15/16
2018/0367518 A1\* 12/2018 Singh ................... H04L 9/3239

OTHER PUBLICATIONS

Kirubashankar et al.; "Design and Implementation of Web Based Remote Supervisory Control and Information System"; International Journal of Soft Computing and Engineering (IJSCE) ISSN: 2231-2307, vol. 1, Issue-4, Sep. 2011; pp. 43-50 (Year: 2011).\*
International Search Report and Written Opinion for International Application No. PCT/US2018/051395 (13 pages).

\* cited by examiner

NETWORK ASSET CHARACTERIZATION, CLASSIFICATION, GROUPING AND CONTROL

DESCRIPTION OF THE RELATED ART

Industrial control systems (ICS) provide hardware and software that monitors and controls the operation of machinery and other devices in industrial environments. ICS are prevalent in a multitude of industries such as in electrical, manufacturing, oil, gas, water, building automation, chemical, etc.

ICS networks have a variety of differences with conventional IT networks within an enterprise. The lifecycle of devices within ICS networks is typically twelve to twenty years and includes a multitude of legacy devices used in combination with new devices. Additionally, the communication characteristics of the devices are deterministic, device sessions can last years, devices are provided by a multitude of different vendors, and the devices use industrial protocols. A challenge with ICS networks is that the networking infrastructure uses industrial, ruggedized devices that are quite different than those of IT networks. This creates a situation where there is a limited or no visibility of devices on the network as well as a limited understanding of the conversations taking place between devices (e.g., machine-to-machine conversations). This is particularly problematic as industrial networks are becoming increasingly vulnerable given the rapid rise of security threats across the organization—from advanced persistent threats, data breaches, and misconfiguration or misuse within the network.

A conventional approach to capture a network stream of data through the ports of a switch is to utilize SPAN. However, SPAN is not as readily available within industrial network infrastructure as within IT networks. SPAN also has serious deficiencies for cybersecurity. First, the frame timing within the aggregated SPAN data is not the original frame timing. The CPU of the switch inserts the time into the frames as part of the aggregation function. This is a serious issue when performing an analysis for a time-based attack. Second, the SPAN typically has the lowest priority of the major switch functions. This can lead to a scenario where during peak loading of the switch CPU the SPAN will be bypassed causing a gap in the data stream. Another conventional approach for capturing a network stream is the use of TAPs. Although TAPs have the advantage of offering an exact copy of a data stream, TAPS have their own challenges. For one, a tremendous amount of sensors would be required in order to capture the entire network with TAPs. Along with this challenge, an out of band network cabling infrastructure would be required to integrate all of the sensors together. Additionally, once all the sensors have a management network, the streams would have to be aggregated.

SUMMARY

Techniques applicable to a network orchestration and security platform for a network, such as an industrial control system (ICS) network, are disclosed.

In one embodiment, a method includes: initiating an operational connection of a source in a first security zone to a destination in a second security zone; sending a message in the clear from the source to a security zone egress port of the first security zone; sending the message via a secure conduit from the security zone egress port to a security zone ingress port of the second security zone; sending the message in the clear from the security zone ingress port to the destination; and when the operational connection is re-activated, validating a fingerprint generated for the source to ensure the source is authorized.

In one implementation, the first security zone and the second security zone represent a logical grouping of trust of assets in which communications received by an asset from assets within the same security zone are trusted and communications received by an asset from assets outside the same security zone are untrusted.

In one implementation, the method includes: sending the message via the secure conduit through one or more switches of an industrial control system (ICS) network.

In one implementation, the method includes: includes generating the fingerprint for the source.

In one implementation, sending the message in the clear means sending the message without encryption.

In one implementation, sending the message in the clear means sending the message without tunneling.

In one implementation, the method includes: identifying the operational connection as a new active connection.

In one implementation, the method includes: each time the active connection is re-activated, validating the fingerprint generated for the source to ensure the source is authorized.

In one embodiment, a system includes an industrial control system (ICS) network; a first security zone coupled to the ICS network; a second security zone coupled to the ICS network; a network orchestration and security platform coupled to the ICS network for generating a fingerprint to ensure a source in the first security zone is authorized to send to a destination in the second security zone; where, in operation: the network orchestration and security platform initiates an operational connection from the source to the destination; the source sends a message in the clear to a security zone egress port of the first security zone; the security zone egress port sends the message via a secure conduit to a security zone ingress port of the second security zone; the security zone ingress port sends the message in the clear to the destination; where, when the operational connection is re-activated, the destination validates the fingerprint.

In one embodiment, a system includes a means for initiating an operational connection of a source in a first security zone to a destination in a second security zone; a means for sending a message in the clear from the source to a security zone egress port of the first security zone; a means for sending the message via a secure conduit from the security zone egress port to a security zone ingress port of the second security zone; a means for sending the message in the clear from the security zone ingress port to the destination; a means for, when the operational connection is re-activated, validating a fingerprint generated for the source to ensure the source is authorized.

Other features and aspects of the disclosure will become apparent from the following detailed description, taken in conjunction with the accompanying drawings, which illustrate, by way of example, the features in accordance with various embodiments. The summary is not intended to limit the scope of the invention, which is defined solely by the claims attached hereto.

DETAILED DESCRIPTION

Figure 1A:
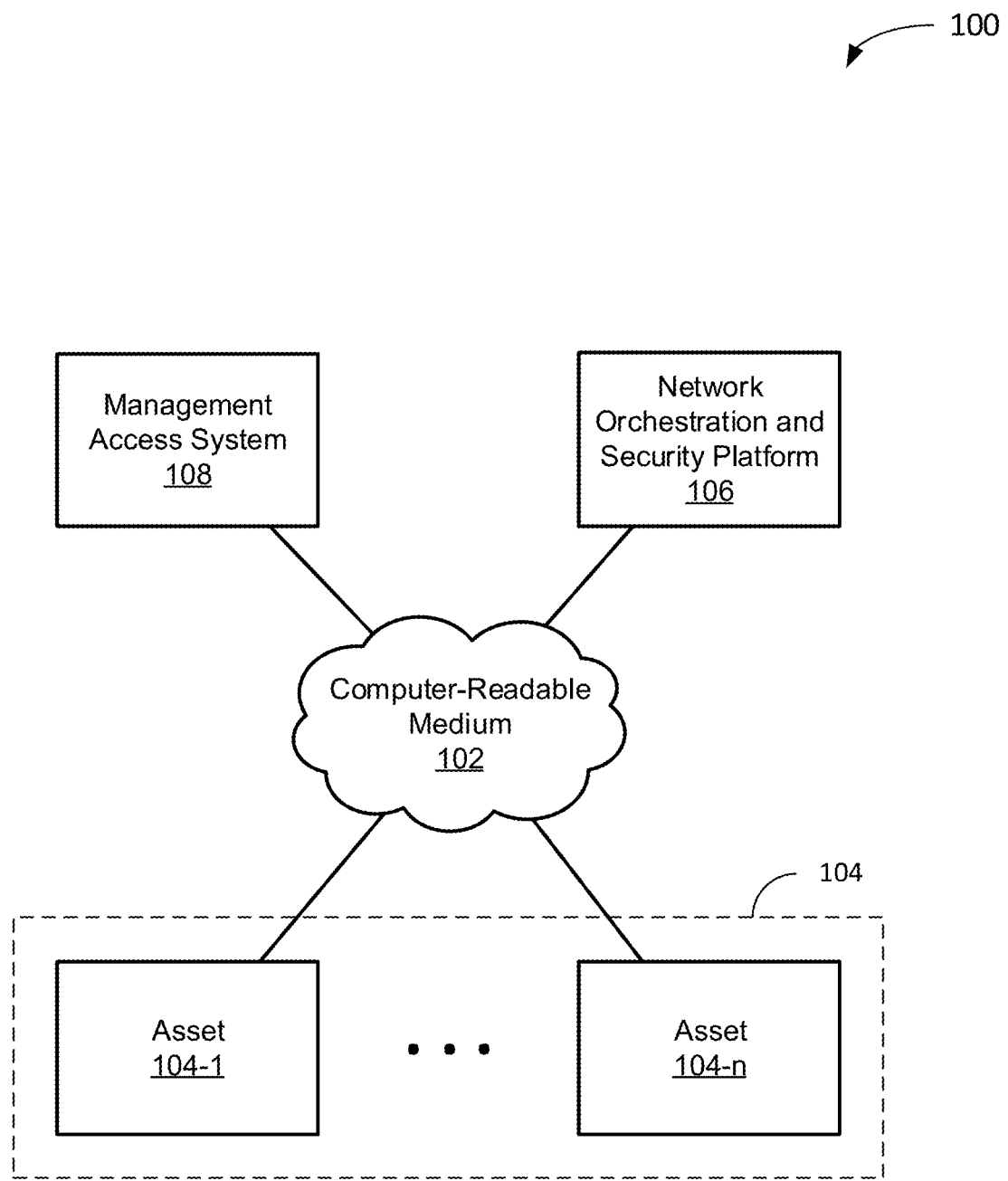
FIG. 1A depicts a diagram of an example of a network orchestration and security platform environment.

As used herein, the term "asset" refers to a device in a network (e.g., an industrial network), a service offered by a device in a network, or some combination thereof. Assets may include, for example, active directories, batch servers, batch clients, data concentrators, engineering workstations, FTP servers, historians, historian web servers, human machine interfaces (HMI), intelligent electronic devices (IED), machine-to-machine interfaces (MMI), motion controllers, programmable automation controllers (PAC), programmable logic controls (PLC), phasor measurement units (PMU), remote terminal units (RTU), supervisory control and data acquisition (SCADA) systems such as SCADA servers, SCADA clients, SCADA web servers, SCADA web clients, synchrophasors, web servers, and other devices and/or services used in networks.

As used herein, the term "security zone" refers to a logical grouping of assets by trust. In some implementations, the term "security zone" may also refer to a logical grouping of assets by trust and cohesive function. Communications between assets within the same security zone may be considered by default to have a higher level of trust than communications between assets across security zones.

As used herein, the term "whiteflow directive" refers to what communication is permitted between two assets that communicate. As used herein, the term "whitelisting policy" refers to a collection of whiteflow directives. In one implementation, the whitelisting policy may be a collection of all whiteflow directives on a network. Alternatively, a whitelisting policy may be a collection of all whiteflow directives on a portion of a network (e.g., a collection of whiteflow directives in a security zone or a collection of whiteflow directives for one asset).

As used herein, the term "threat state level" refers to an indication of a defensive posture for cybersecurity in a network. Each threat state level is assigned a whitelisting policy. A threat state level that is higher than another threat state level on the same network or subnetwork has a more restrictive whitelisting policy (i.e., is more restrictive as to what communications are permitted between assets). The number of threat state levels can range from two to some other desired value.

As used herein, the term "DEFCON levels" is an example of threat state levels. There are five DEFCON levels, which is a number of threat state levels due to the use of the acronym by the United States Armed Forces.

In a Software-Defined Networking (SDN)-implementation, the term "controller" generally refers to a logically centralized entity that determines how packets or frames should be forwarded in a network and communicates this forwarding information to forwarding devices that forward packets or frames to assets. Definition as a logically centralized entity neither prescribes nor precludes implementation in a distributed form, nor details such as the federation of multiple controllers, the hierarchical connection of controllers, communication interfaces between controllers, nor virtualization or slicing of network resources. In a particular implementation, a controller may be implemented in accordance with Issue 1.1 of "SDN Architecture" as prescribed by the Open Networking Foundation (Document ONF TR-521).

In an SDN-implementation, a "forwarding device" refers to a networked device (e.g., a switch, router, gateway, or access point) that forwards packets or frames to assets or other forwarding devices based on forwarding information received from a controller.

FIG. 1A depicts a diagram 100 of an example of a network orchestration and security platform environment. The diagram 100 includes a computer-readable medium 102, assets 104-1 to 104-n (referred to collectively herein as "assets 104") coupled to the computer-readable medium 102, a network orchestration and security platform 106 coupled to the computer-readable medium 102, and a management access system 108 coupled to the computer-readable medium 102.

The computer-readable medium 102 and other computer readable mediums discussed in this paper are intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The computer-readable medium 102 and other computer readable mediums discussed in this paper are intended to represent a variety of potentially applicable technologies. For example, the computer-readable medium 102 can be used to form a network or part of a network that includes assets operating at multiple conceptual levels (using naming conventions of the Purdue Reference Model for Control Hierarchy logical framework (ISA99 Committee, 2004)): Level 0—physical process, Level 1—basic control, Level 2—area supervisory control, Level 3—site manufacturing operations and control systems, Level 4—site business planning and logistics, Level 5—enterprise. Where two components are co-located on an asset, the computer-readable medium 102 can include a bus or other data conduit or plane. Where a first component is co-located on one asset and a second component is located on a different asset, the computer-readable medium 102 can include a wireless or wired back-end network or LAN. The computer-readable medium 102 can also encompass a relevant portion of a WAN or other network, if applicable.

The assets, systems, and computer-readable mediums described in this paper can be implemented as a computer system or parts of a computer system or a plurality of computer systems. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. The bus can also couple the processor to non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered to be "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus can also couple the processor to the interface. A interface can include one or more input and/or output (I/O) devices. Depending upon implementation-specific or other considerations, the I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device. The interface can include one or more of a modem or network interface. It will be appreciated that a modem or network interface can be considered to be part of the computer system. The interface can include an analog modem, ISDN modem, cable modem, token ring interface, satellite transmission interface (e.g. "direct PC"), or other interfaces for coupling a computer system to other computer systems. Interfaces enable computer systems and other devices to be coupled together in a network.

The computer systems can be compatible with or implemented as part of or through a cloud-based computing system. As used in this paper, a cloud-based computing system is a system that provides virtualized computing resources, software and/or information to end user devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their end user device.

A computer system can be implemented as an engine, as part of an engine or through multiple engines. As used in this paper, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described in this paper.

The engines described in this paper, or the engines through which the systems and devices described in this paper can be implemented, can be cloud-based engines. As used in this paper, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud-based datastore is a datastore that is compatible with cloud-based computing systems and engines.

Referring once again to the example of FIG. 1A, the assets 104 are intended to represent a network of assets and infrastructure under the control of an entity. In a specific implementation, the network is an industrial network, but some other applicable personal or enterprise network is possible. The network will also include infrastructure, which can generally be conceptualized as the part of the computer-readable medium 102 that is under the control of the applicable entity or on the edge of the network. In a specific implementation, the assets 104 include wired or wireless interfaces through which the assets 104 can send and receive data to and from the computer-readable medium 102. The assets 104 function to transmit data between sources and destinations that may be in or outside the network.

The assets 104 may or may not include unique identifiers that can be used in the transmission of data. Unique identifiers of the assets 104 can include identifiers created in accordance with Internet Protocol version 4 (hereinafter referred to as "IPv4"), Media Access Control (MAC) addresses, or identifiers created in accordance with Internet Protocol version 6 (hereinafter referred to as "IPv6"), of which both protocol versions are hereby incorporated by reference. In particular implementations, further described below, the assets 104 may be assigned a unique ID by the network orchestration and security platform 106.

Depending upon implementation-specific or other considerations, the assets 104 can include applicable communication interfaces for receiving and sending data according to an applicable wireless device protocol. Examples of applicable wireless device protocols include Wi-Fi, ZigBee®, Bluetooth®, and other applicable low-power communication standards. In a specific implementation, the network devices act as stations. A station, as used in this paper, can be referred to as a device with a media access control (MAC) address and a physical layer (PHY) interface to a wireless medium that complies with the IEEE 802.11 standard. Thus, for example, the network devices can be referred to as stations, if applicable. IEEE 802.11a-1999, IEEE 802.11b-1999, IEEE 802.11g-2003, IEEE 802.11-2007, and IEEE 802.11n TGn Draft 8.0 (2009) are incorporated by reference. As used in this paper, a system that is 802.11 standards-compatible or 802.11 standards-compliant complies with at least some of one or more of the incorporated documents' requirements and/or recommendations, or requirements and/or recommendations from earlier drafts of the documents, and includes Wi-Fi systems. Wi-Fi is a non-technical description that is generally correlated with the IEEE 802.11 standards, as well as Wi-Fi Protected Access (WPA) and WPA2 security standards, and the Extensible Authentication Protocol (EAP) standard. In alternative embodiments, a station may comply with a different standard than Wi-Fi or IEEE 802.11, may be referred to as something other than a "station," and may have different interfaces to a wireless or other medium.

In a specific implementation, the assets 104 are configured to access network services in compliance with IEEE 802.3. IEEE 802.3 is a working group and a collection of IEEE standards produced by the working group defining the physical layer and data link layer's MAC of wired Ethernet. This is generally a local area network technology with some wide area network applications. Physical connections are typically made between nodes and/or infrastructure devices (hubs, switches, routers) by various types of copper or fiber cable. IEEE 802.3 is a technology that supports the IEEE 802.1 network architecture. As is well-known in the relevant art, IEEE 802.11 is a working group and collection of standards for implementing wireless local area network (WLAN) computer communication in the 2.4, 3.6 and 5 GHz frequency bands. The base version of the standard IEEE 802.11-2007 has had subsequent amendments. These standards provide the basis for wireless network products using the Wi-Fi brand. IEEE 802.1 and 802.3 are incorporated by reference.

In the example of FIG. 1A, the network orchestration and security platform 106 is intended to represent a platform that has been designed to simplify network design, deployment, configuration, and orchestration for networks, such as industrial control networks. In a specific implementation, the network orchestration and security platform 106 integrates network security concepts into a unified system for providing comprehensive situational awareness. The unified system and comprehensive situation awareness yields improved overall efficiency of configuration tasks, providing prevention and protection controls applicable across various network segments, and integration of support for incident response personnel. For example, the network orchestration and security platform 106 can provide visibility into what devices are on a network as well as what conversations are taking place (e.g., M2M communications) and using which languages (network protocols) and information related thereto is logged for historical access. The network orchestration and security platform 106 can leverage Software Defined Networking (SDN) and incorporate features such as Network Segmentation, Security Zones, Whitelisting Security Policy, and Threat State Modeling. SDN devices, such as SDN applications, SDN controllers, SDN forwarding devices, SDN Control to Data-Plane Interfaces (CDPI), and SDN NorthBound Interfaces (NBI) to name several. In a specific implementation, the solution is applied to industrial network configuration and management, although techniques described in this paper may be applicable to other types of networks.

In a specific implementation, the network orchestration and security platform 106 functions to generate security zones including ICS assets that are in the six levels of the Purdue Reference Model for Control Hierarchy logical framework (ISA99 Committee, 2004). For example, security zones may be generated for motors, flow meters, and sensors (representative examples of Level 0 devices of the Purdue Reference Model), PLCs (representative examples of Level 1 devices of the Purdue Reference Model), SCADA systems or HMIs (representative examples of Level 2 devices of the Purdue Reference Model), historians, Manufacturing Execution Systems (MES), or Operations Management Systems (MOS) (representative examples of Level 3 devices of the Purdue Reference Model), devices that facilitate management of business-related activities of a manufacturing operation (representative examples of Level 4 devices of the Purdue Reference Model), devices that facilitate corporate IT infrastructure systems and applications (representative examples of Level 5 devices of the Purdue Reference Model) or the like. Devices of a given level can generally communicate with devices only one level down and only one level up. The security zones may be visually represented as a logical container of assets whose function is related to the automation of a related physical process. For example, the infeed process for a chemical facility would have an automated system for the delivery of raw product from rail cars and trucks and unloading of the dry product to storage silos and to batch tanks for wet product. In a specific implementation, the security zones define a logical grouping of trust and have policy rules that can be applied to determine what communication is allowed (e.g., what M2M communications are permitted) and by what languages these conversations should be permitted (e.g., what network protocols).

In a specific implementation, the network orchestration and security platform 106 is implemented, at least in part, through a local agent on a network having all subnetworks under common administrative control, generally referred to as, e.g., an enterprise network or a home network. A local agent, as used in this paper, is implemented on a physical device locally coupled to at least one of the assets 104. Depending upon implementation or other considerations, the network orchestration and security platform 106 can be implemented as part of a private cloud. A private cloud implementing the network orchestration and security platform 106, at least in part, can be specific to an entity. The network orchestration and security platform 106 may or may not be a dedicated platform for a single public or private network, though that is a likely implementation given the desire by enterprises to maintain control of their respective networks. However, some aspects of the network orchestration and security platform 106 could provide services to multiple networks not under common administrative control, while other aspects could be offered only to a specifically-identified network under the administrative control of the applicable entity.

In the example of FIG. 1A, the management access system 108 is intended to represent one or more devices (e.g., a workstation, a laptop, a smartphone, etc.) through which agents communicate with the network orchestration and security platform 106. Agents can be human or artificial and will generally have Create, Read, Update, Delete (CRUD) rights to all or a subset of data associated with an applicable network or subnetwork. Such rights can be used to access data and to provide commands (the equivalent of, e.g., updating an instruction set) to assets to change asset behavior or drop asset communications from the network.

In a specific implementation, a portion of the management access system 108 is implemented remote from the network devices 104 and the network orchestration and security platform 106. Depending upon implementation-specific or other considerations, portions of the management access system 108 can transmit and receive data to and from the enterprise network through virtual private network (hereinafter "VPN") tunnels. For example, the management access system 108 may be capable of receiving outbound network traffic sent from the network devices 104 or the network orchestration and security platform 106 over a VPN tunnel. In a specific example, VPN tunnels through which the management access system 108 send and receive data are maintained using dedicated networking equipment, such as dedicated routers.

In an example of operation of the example system shown in FIG. 1A, the assets 104 and at least a portion of the computer-readable medium 102 form, e.g., an industrial network. The network orchestration and security platform 106—or local agents associated therewith that are also part of the industrial network—provides data to and receives instructions from the management access system 108. In an example of operation, the system provides a visually-based security policy development approach for industrial networks, which enables, for example, the management access system 108 to provide a graphical representation of security zones enabling a simplified drag-and-drop operation of assets from one zone to the next by the administrator. This workflow involves an administrator viewing a logical network topology of assets of the system and observed conversations between assets. The administrator can select the conversation link between assets and select an appropriate action: Allow, Drop (conversation will not be allowed and no deny response is provided to sender), Alert (allow but generate an alert anytime that conversation is observed, Monitor (allow and copy stream to orchestrator for further analysis), or Encrypt (Encrypt the communication flow from the source ingress port to the destination egress port).

Continuing the example, a real-time peer review cycle is incorporated for configuration workflows. This peer review mechanism includes a list of stakeholders for the configuration that allows for real-time notification when a change is made and is then ready for review. Via the management access system 108, a peer (team member) can access a first (e.g., original, old, previous, or current) network configuration, the proposed change, who proposed the change, and the reason for the change. The data can be presented graphically, which is of particular value for the network configuration and proposed changes because they can be presented in association with the security zone paradigm. The peer (team member) can than accept the change or deny the change and provide the reason for denial. This approach increases the efficiency of the network configuration and security design process tremendously.

In a specific implementation, a security policy is not defined for all threat levels and threat vectors. Rather, a threat state model resembles the defense readiness model of the US Military, DEFCON, made applicable to security measures for, e.g., an industrial network that controls a physical process. By adopting this type of methodology, the security for a site becomes agile and adaptable to the threat state of the system or site. This approach can provide a reduction in autonomous attack surface of the industrial control system. Thus, when the threat is nonexistent (DEFCON 5), the maximum functionality and connectivity can be realized. Yet, when there is a direct threat against the system the system can ensure the mission critical function of the process is insured at an appropriate level (DEFCON 4, 3, 2, or 1) to define an associated defensive posture for cybersecurity. This is accomplished by defining the security zones within a security zone management application of the network orchestration and security platform 106. A next workflow is defining the Whitelisting policy by designing each WhiteFlow Directive within the unique visualization approach. The combination of the security zones plus the Whitelisting policy is then assigned to a threat state (e.g. DEFCON 5). When an administrator wants to configure the Whitelisting policy for the next elevated threat state, which in this example is DEFCON 4, the DEFCON 5 visualization is provided via the management access system 108 as a starting point. The concept is that the Whitelisting policy becomes more and more restrictive with each threat-state DEFCON level. The incorporation of threat indicators and threat intelligence can be fed into a model to define recommended actions via the management access system 108. The actual definition of each DEFCON threat state is predefined during configuration and can be integrated into a Disaster Recovery Process (DRP) at the network orchestration and security platform 106.

As an administrator configures the Whitelisting policy, the policy is tested in a simulated environment to test for any violations or indications of adverse reactions by the system. For example, a first test can be a simulation test. After the simulation test, the policy is submitted to the peer review team for approval. Once approval has been granted, the system is still not permitted to execute the policy in a protective state. Each of the Whitelisting rules are converted to a special type of "alert only" rule that provides a permissive rule environment while evaluating any possible adverse reactions prior to their acceptance as a protective policy.

Figure 1B:
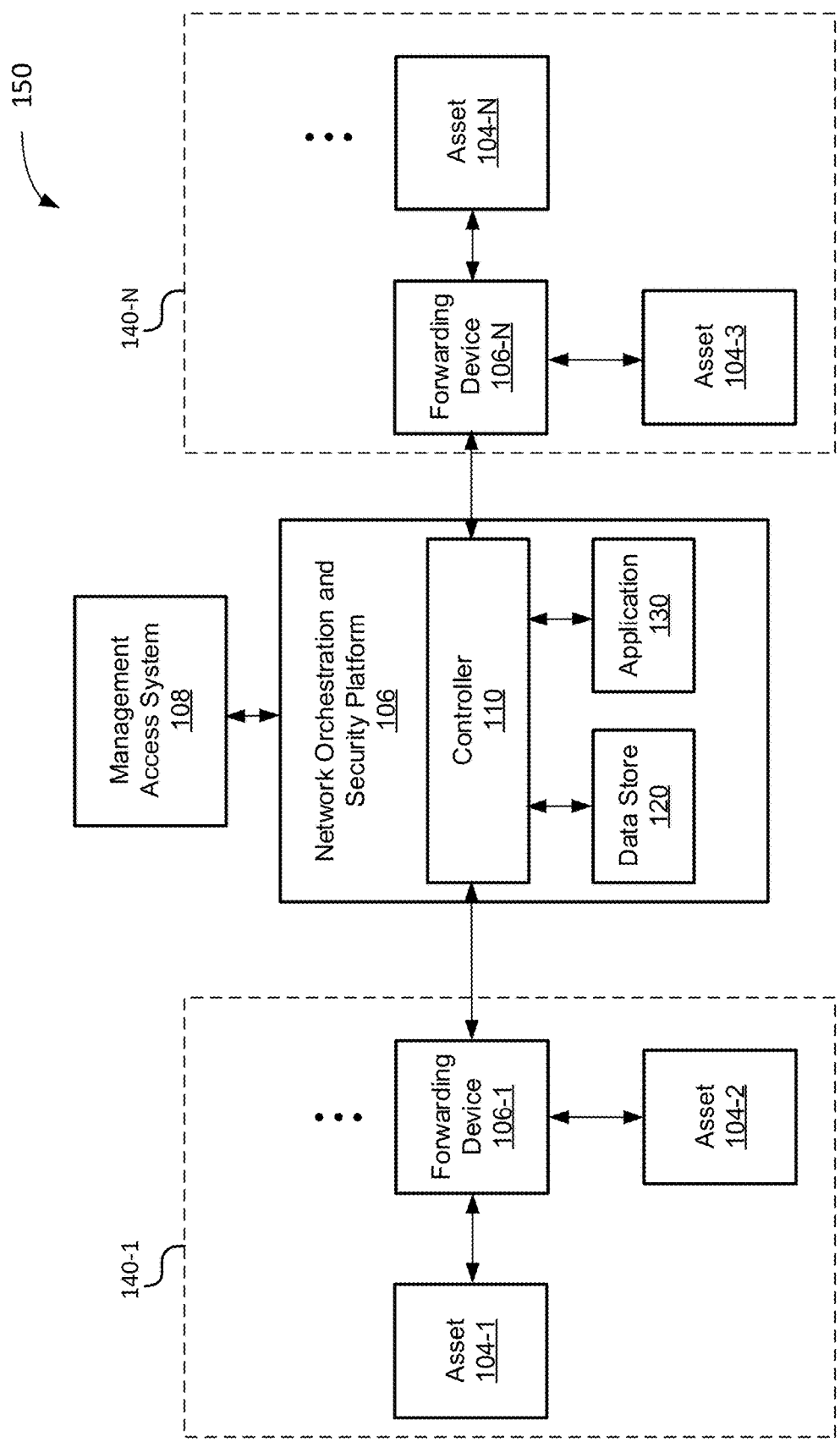
FIG. 1B illustrates an example networking system that leverages software-defined networking in accordance with a particular implementation to provide network orchestration and security.

FIG. 1B illustrates an example networking system 150 that leverages software-defined networking in accordance with a particular implementation to provide network orchestration and security. System 150 comprises assets 104, forwarding devices 106-1 to 106-N (referred to collectively herein as forwarding devices "106"), a management access system 108, and a network orchestration and security platform 106 including controller 110, data store 120, and application 130. In this implementation, software-defined networking may be leveraged to simplify network design, deployment, configuration, and orchestration for a network such as an industrial control network.

Assets 104 are connected to a forwarding device 106 that is connected via a secure command channel to controller 110 (i.e., transport layer security is established between forwarding device 106 and controller 110). Controller 110 may communicate with forwarding devices 106 using any suitable protocol known in the art (e.g., OpenFlow, OVSDB, etc.). In this implementation, controller 110 may be used to maintain a centralized view of the entire network infrastructure, including assets 104-1 to 104-N, conversations taking place between assets 104-1 to 104-N, the protocols/protocol behaviors of conversations taking place between assets 104-1 to 104-N, and forwarding devices 106-1 to 106-N. In implementations, controller 110 is implemented as an application executed on a server.

Controller 110 identifies communication flows on the network, determines how packets or frames should be forwarded in a network, and communicates this forwarding information to forwarding devices 106. This forwarding information (e.g., fowarding rules/configuration) may be sent using a secure command channel (e.g. OpenFlow). As further described below, this functionality may be implemented by applying a whiteflow directive to each communication flow on the network, which may be used to determine which assets are allowed to communicate and what the permitted protocols and protocol behaviors are between the assets. The collection of whiteflow directives on the network may be stored as a whitelist policy that is assigned a threat state level. Additionally, controller 110 may be used to assign security zones 140-1 to 140-N (referred to collectively herein as security zones "140") which may be used to create a logical grouping of trust of assets 104.

Data store 120 may store information associated with assets on the network (e.g., asset type, asset vendor, asset level (e.g., under the Purdue Model), asset IP address, asset MAC address, asset protocols/protocol behaviors, etc.), information associated with forwarding devices on the network (e.g., forwarding device ID, forwarding device port information, etc.), whitelisting policies, security zone information, a historical log of all communications that take place between assets, a historical log of all assets and forwarding devices that have been on the network, user logs of changes made to assets, application audit logs, and other information.

Application 130, when executed, may provide an interface for devices of management access system 108 to use the controller to manage device behavior on the network. In various implementations further described below, application 130 may provide a graphical user interface for visualizing, editing, and tracking assets, security zones, whiteflow directives, whiteflow policies, network maps (e.g., logical and physical network maps), and other information on the network. Although illustrated in FIG. 1B as being a component of network orchestration and security platform 106, in some embodiments application 130 may be a component of a management access system 108.

FIGS. 2-5 illustrate an example of a high level workflow using a forwarding device deployment model to create a scalable network such as an industrial network. Techniques described herein will primarily described with reference to industrial networks, however one having ordinary skill in the art would appreciate that in some instances these techniques may be applied to other types of networks.

Figure 2:
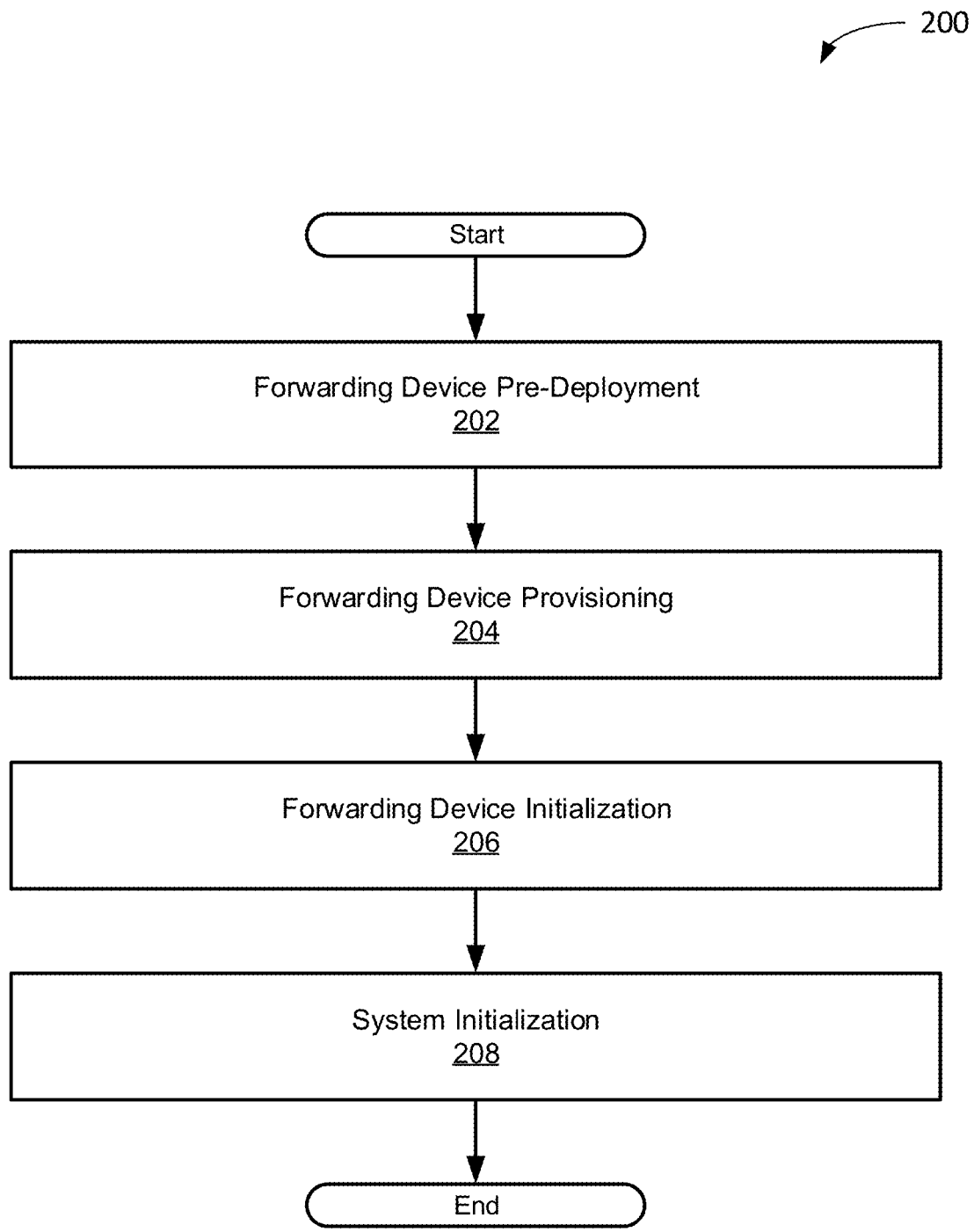
FIG. 2 depicts a flowchart of an example of a method of forwarding device deployment and system initialization.

FIG. 2 depicts a flowchart 200 of an example of a method of forwarding device deployment and system initialization. The flowchart 200 starts at block 202 with forwarding device (e.g., switch) pre-deployment. The actions and configurations taken during forwarding device pre-deployment can depend upon implementation and configuration-specific factors. For example, forwarding device pre-deployment can entail setting up a network orchestration and security platform, such as the network orchestration and security platform described by way of example in association with FIG. 1.

After setting up the platform, it may or may not be necessary to deploy a controller depending upon whether controller-less forwarding devices are deployed, though in a specific SDN implementation, at least an SDN controller is deployed prior to forwarding device deployment. Conceptually, any actions or configurations taken prior to deployment of a forwarding device could be considered part of forwarding device pre-deployment, with the mundane aspects being omitted from this paper and with the understanding techniques described in this paper may necessitate certain pre-deployment activities to ensure awareness of and proper function of deployed forwarding devices. Specifically, the network orchestration and security platform is intended to retain its complete visibility of network infrastructure before and after deployment of forwarding devices.

In the example of FIG. 2, the flowchart 200 continues to block 204 with forwarding device provisioning. An example of forwarding device provisioning is described in detail below with reference to FIG. 3. At block 206, the forwarding devices are initialized. An example of forwarding device initialization is described in detail below with reference to FIG. 4. At block 208, the system is initialized. An example of system initialization is described in detail below with reference to FIG. 5.

Figure 3:
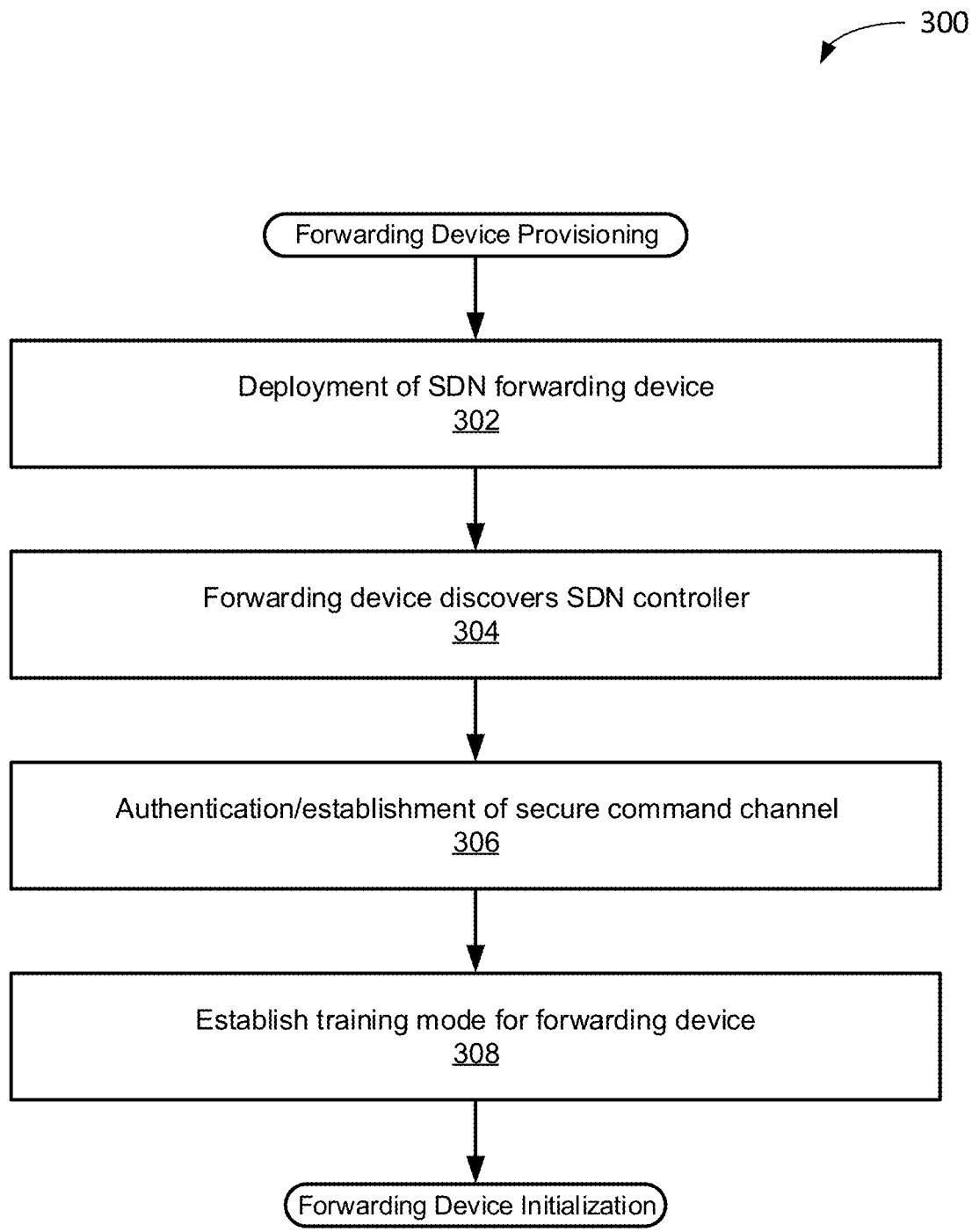
FIG. 3 depicts a flowchart of an example of forwarding device provisioning.

FIG. 3 depicts a flowchart 300 of an example of forwarding device provisioning. The flowchart 300 starts at block 302 with deployment of a software-defined networking (SDN) forwarding device. In an SDN-compatible implementation, administrators may manage network services through abstraction of lower-level functionality to facilitate dynamic, scalable computing and storage needs of more modern computing environments. This is done by decoupling the system that makes decisions about where traffic is sent (the control plane) from the underlying systems that forward traffic to the selected destination (the data plane). In an SDN-compatible implementation, the provisioning of the forwarding device may be carried out so as to support directly programmable network control and abstraction of underlying infrastructure from applications and network services.

At block 304, the forwarding device discovers the SDN controller. The forwarding device discovers the SDN controller, which controls behavior of the forwarding device in the network. At block 306, the forwarding device is authenticated by the controller and a secure command channel is established. The secure command channel enables communication with the forwarding device on the control plane. In a specific implementation, the control plane is decoupled from the data plane to support dynamic, scalable computing and enable administrators to manage network services through abstraction of lower-level functionality of the forwarding device.

At block 308, a training mode for the forwarding device is established. Industrial devices communicate with other devices in a known pattern which is unique for the site and device's role. In a specific implementation, the network traffic is inspected and protocol requests and responses are analyzed to identify a role of each device. Other indicators to define manufacturer and software/firmware revision levels can also be utilized. Upon the deployment of a new forwarding device to the network, a training mode is enabled which allows the controller to learn the flows needed, and responsively configure the forwarding device. During this process, the forwarding device is forwarding the data stream from its physical ports to the controller.

Figure 4:
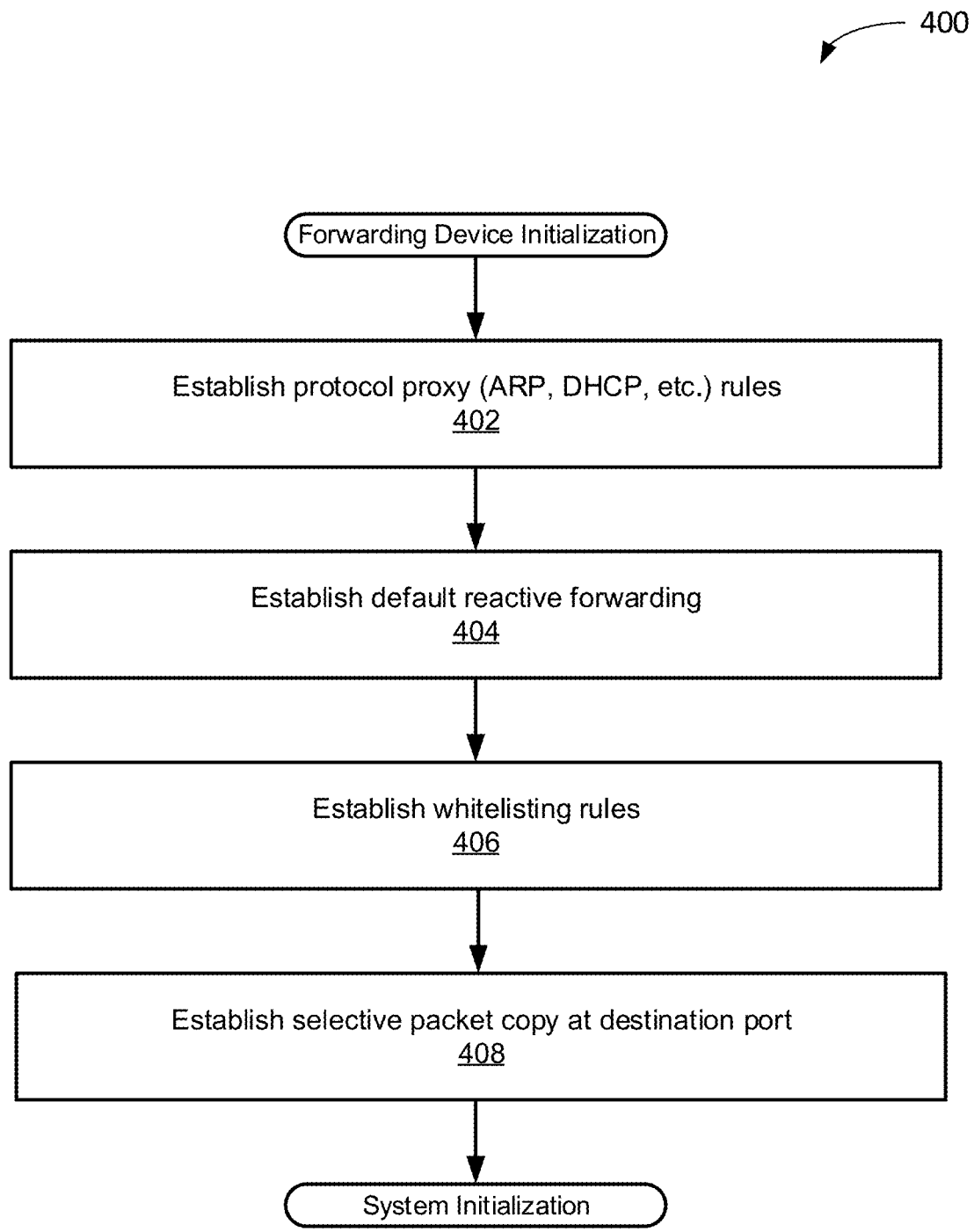
FIG. 4 depicts a flowchart of an example of forwarding device installation.

FIG. 4 depicts a flowchart 400 of an example of forwarding device initialization. The flowchart 400 starts at block 402 where protocol proxy rules are established. Due to the network infrastructure visibility afforded by techniques described in this paper, certain legacy network services such as Address Resolution Protocol (ARP) and other network services such as Dynamic Host Configuration Protocol (DHCP) and Domain Name System (DNS) are not necessary as conventionally implemented. End point hosts connected to forwarding device infrastructure may utilize these services, but because broadcast traffic within the broadcast domain is eliminated, the technique can improve network efficiency. In a specific implementation, protocol proxies are used for applicable services: ARP Proxy, DHCP Proxy, and DNS Proxy, to name three.

In the example of FIG. 4, the flowchart 400 continues to block 404 where default reactive forwarding is established. In a specific implementation, a network orchestration and security platform (e.g., a SDN controller) pushes a configuration to a forwarding device to instruct the forwarding device to forward applicable traffic to an appropriate proxy server (e.g., SDN controller). The proxy server (e.g., SDN controller) then responds appropriately to the sender.

At block 406, full mesh whitelisting rules are established for assets on the network. Whitelisting allows only trusted communication between trusted assets. In an SDN-compatible implementation, assets are connected to SDN forwarding devices that are then connected via a command channel to an SDN controller. The controller identifies network flows, each of which has a whiteflow directive applied. This directive determines which assets are allowed to communicate and determines what the permitted protocols are, and the allowed actions. For example, a whiteflow directive may allow a SCADA server to initiate communications over HTTP with a PLC over a TCP port 80. As another example, a whiteflow directive may allow an HMI to communicate with an IED using the DNP3 protocol.

As threat indicators, threat intelligence, or other factors determine threat level has risen past a defined state definition, the DEFCON level may be manually or automatically changed to a higher defense readiness level. In some instances the DEFCON level may be changed for the entire network, for a portion of the network (e.g., a security zone), or for an asset. The new DEFCON level has an associated whitelist policy that is loaded into the network orchestration and security platform. The network orchestration and security platform creates the appropriate flow rules for each switch in the current DEFCON level and transmits a new predefined configuration to each switch in the network infrastructure. This approach allows for cybersecurity agility of the controls system to respond appropriately to a given threat level. During DEFCON 5 the system can perform at its most unrestrictive state. For DEFCON 1, e.g. only mission critical M2M communication and types of communication may be allowed. For example, say DEFCON 5 is assigned to a whitelist policy. In a specific implementation, to configure DEFCON 4, DEFCON 5 is loaded as a starting point for the configuration and more restrictions are added to produce a more restrictive policy than DEFCON 5 as the definition for DEFCON 4. This process is repeated for each DEFCON level until all five DEFCON levels have an associated whitelist policy defined and assigned.

By way of example, consider a DEFCON 5 whitelist policy that permits a PLC and SCADA to communicate using the following protocols: FTP, EthernetIP, and HTTP. As the DEFCON level rises from level 5 to level 1, protocols that are no longer mission critical (e.g., HTTP, FTP) may be dropped while mission critical protocols (e.g., EthernetIP may be allowed).

In the example of FIG. 4, the flowchart 400 continues to block 408 where selective packet copy at destination ports is established. At block 408, a packet stream may be captured and forwarded to the controller for further analysis and/or analytics.

Figure 5A:
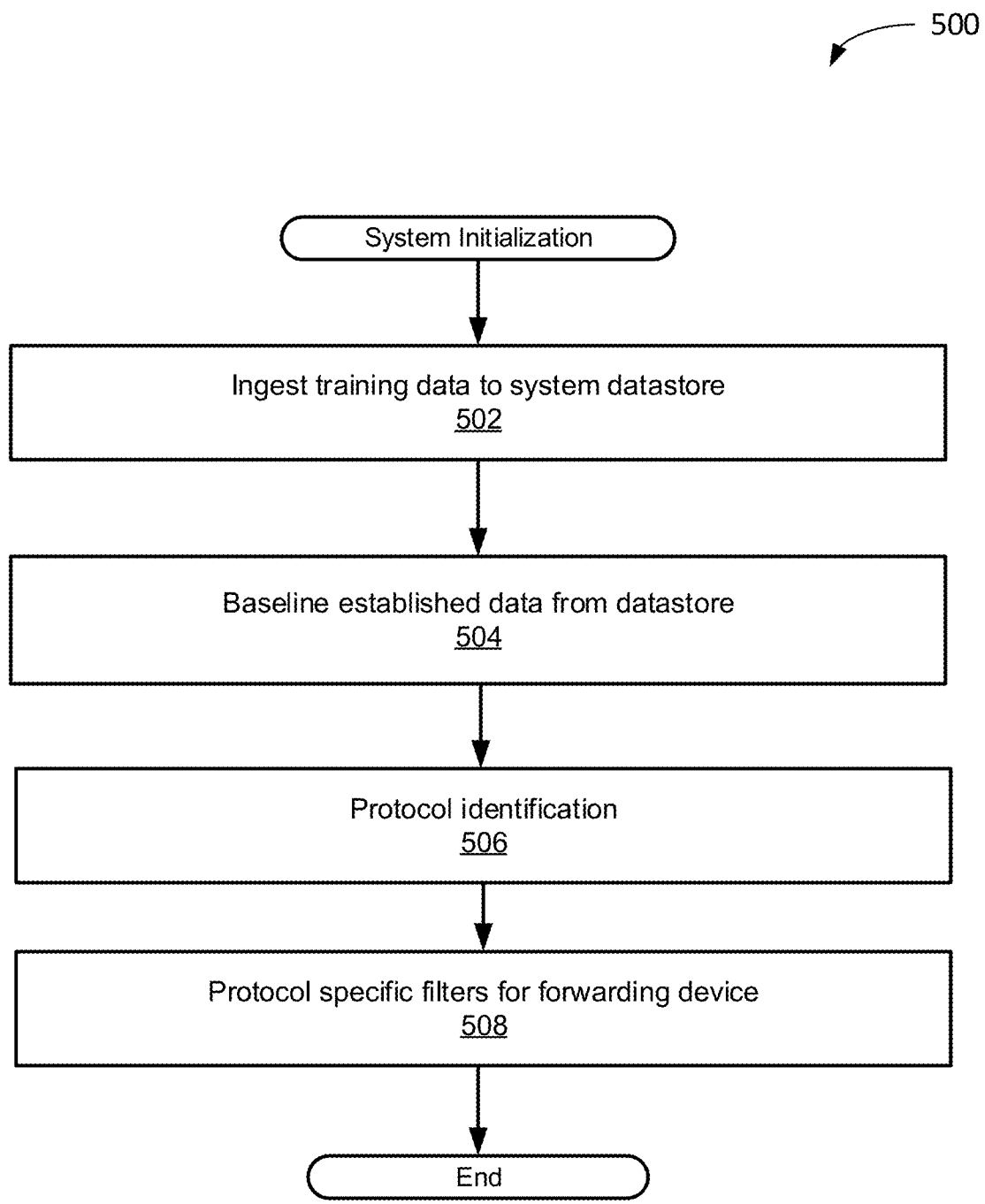
FIG. 5A depicts a flowchart of an example of system initialization.

FIG. 5A depicts a flowchart 500 of an example of a method for system initialization. The flowchart 500 starts at block 502 where training data is ingested to a system datastore (e.g., by manual user input) and proceeds to block 504 where a baseline is established from the ingested training data. In embodiments, the training data may generate a baseline mapping of the likelihood that a particular protocol and protocol behavior corresponds to an asset type.

Figure 5B:
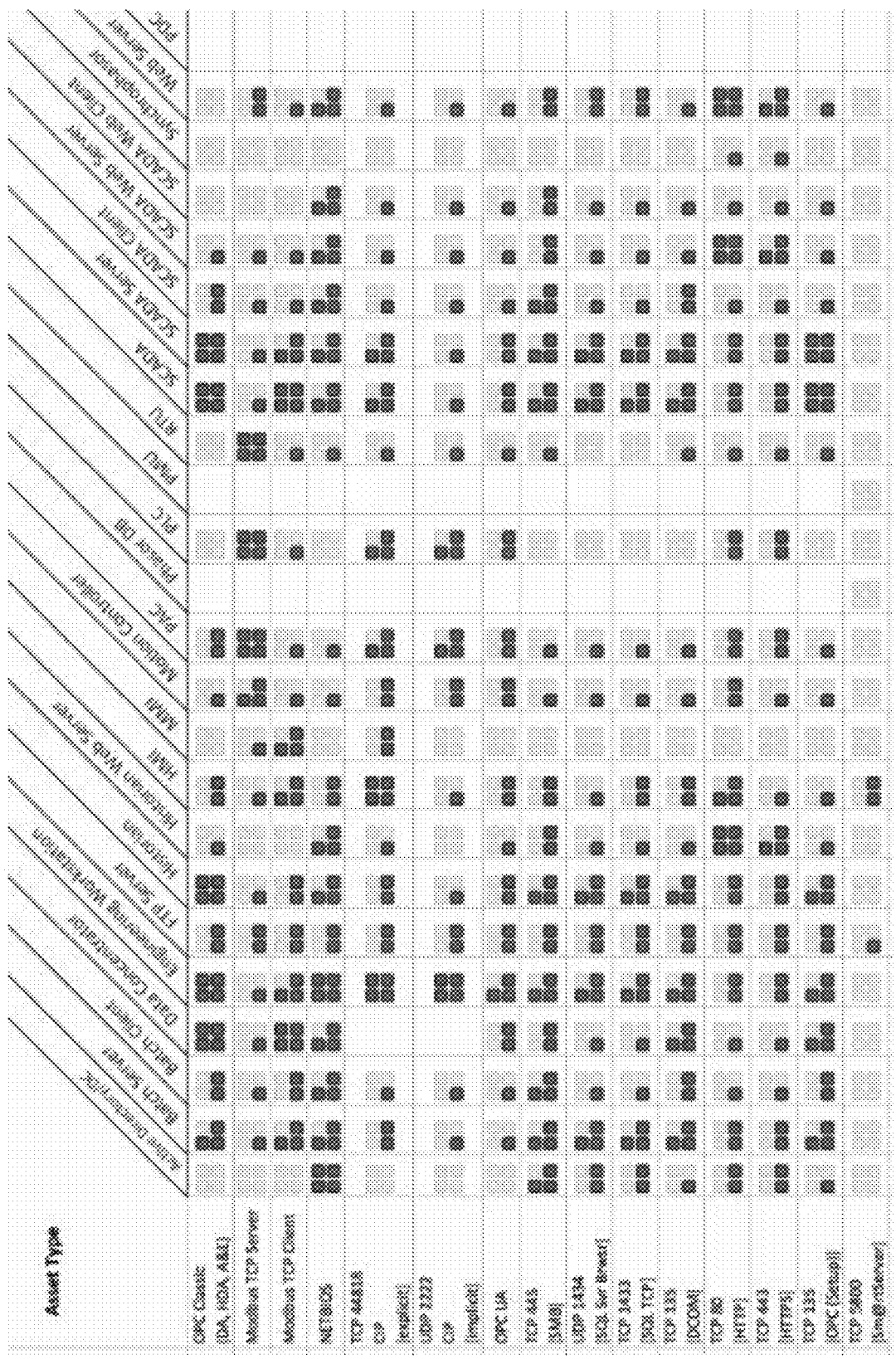
FIG. 5B illustrates an example behavioral tree mapping of protocol and protocol behaviors to asset types in an industrial network.

FIG. 5B illustrates an example behavioral tree mapping of protocol and protocol behaviors (e.g., UDP 2222 CIP (implicit), TCP 44818 CIP (explicit)) to asset types (e.g., HMI, PLC, SCADA) in an industrial network. As shown in this example, a five-level Likert scale indicates the likelihood that a particular protocol and protocol behavior is exhibited by an asset type. In this example, no solid squares indicates that an asset type never exhibits the protocol/protocol behavior, one solid square indicates that an asset type rarely exhibits the protocol/protocol behavior, two solid squares indicates that the asset type frequently exhibits the exhibits the protocol/protocol behavior, and four solid squares indicates that the asset type always exhibits the protocol/protocol behavior.

By way of example, the Activity Directory asset type will never use the three protocols of the Open Platform Communications classic family: data access (DA), historical data access (HAD), and Alarm and Events (A&E). By contrast, the Batch Server asset type will frequently use these protocols. As another example, if Modbus information is being sent using the Transmission Control Protocol (i.e., Modbus TCP), it may give an indication of the asset type depending on where Modbus TCP is acting as a server or a client. For example, if the protocol behavior is Modbus TCP Client, then it is much more likely that the asset type is supervisory such as a SCADA as opposed to a PLC. Conversely, if the protocol behavior is Modbus TCP Server, then it is much more likely that the asset type is a PLC as opposed to a SCADA.

Although the behavioral tree mapping of protocol behavior to asset type in FIG. 5B is implemented using a Likert scale with discrete levels, as would be appreciated by one having skill in the art, other mappings may be used. For example, a protocol behavior may be mapped to a continuous probability value (e.g., normalized to 0-1) for each asset type. Additionally, the mapping may be weighted based on the frequency with which an asset type appears in comparison to another asset type, the type of network where training data is being ingested, the presence of other protocols/protocol behaviors, and other factors. For instance, an industrial network of a power distribution center is likely to have a different distribution of asset types and protocols/protocol behaviors as compared to a manufacturing plant.

At block 506, protocols are identified. Once the protocol has been identified, the user has the ability to define a WhiteFlow directive based upon the protocol. At block 508, protocol-specific filters are established for the forwarding device.

Figure 6:
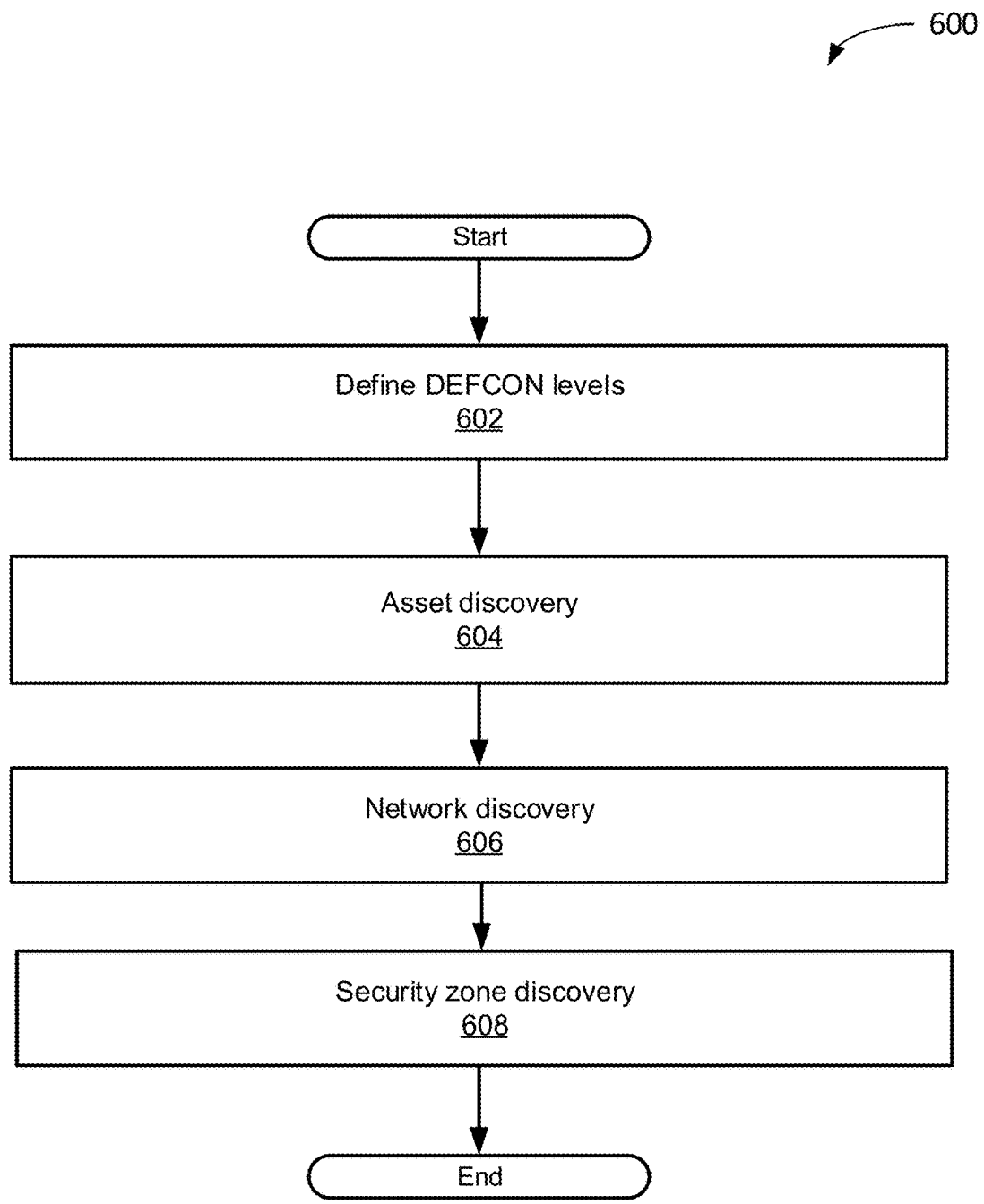
FIG. 6 depicts a flowchart of an example of a method of security learning.

FIGS. 6-9 are intended to illustrate an example of security learning. FIG. 6 depicts a flowchart 600 of an example of a method of security learning. The flowchart 600 starts at block 602 which includes defining the DEFCON levels.

In the example of FIG. 6, the flowchart 600 continues to block 604, which includes asset discovery. An example of asset discovery is described below with reference to FIG. 7.

In the example of FIG. 6, the flowchart 600 continues to block 606, which includes network discovery. An example of network discovery is described below with reference to FIG. 8.

In the example of FIG. 6, the flowchart 600 continues to block 608, which includes security zone discovery. An example of security zone discovery is described below with reference to FIG. 9.

Figure 7:
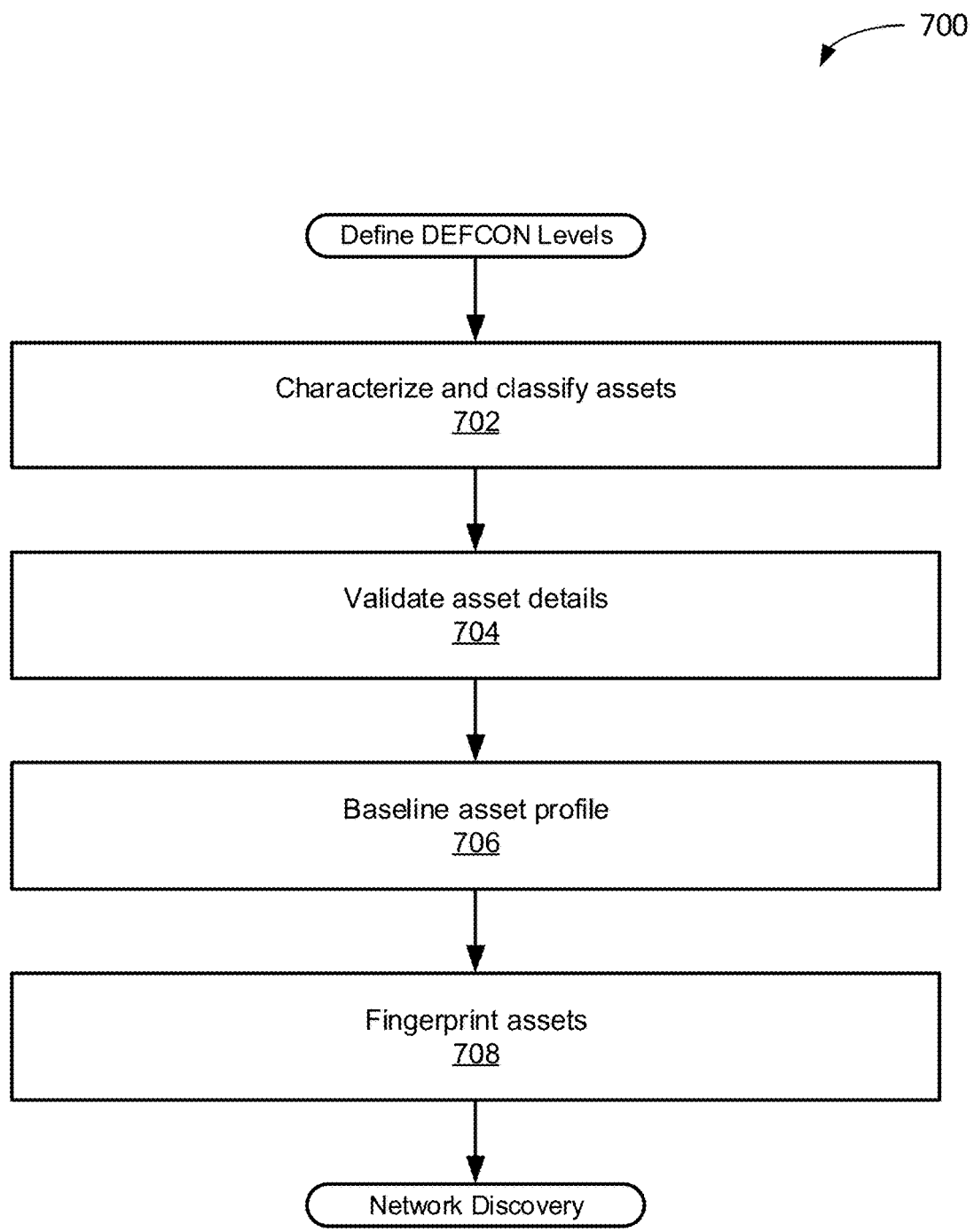
FIG. 7 depicts a flowchart of an example of a method of asset discovery.

FIG. 7 depicts a flowchart 700 of an example of a method of asset discovery. The flowchart 700 starts at block 702, which includes characterization and classification of assets. At block 704, the assets are validated. At block 706, a baseline asset profile is established.

In the example of FIG. 7, the flowchart 700 continues to block 708, which includes fingerprinting of assets. In general, fingerprinting uses registered data to create a data structure (the fingerprint) that can be compared against another data structure in an untrusted message. Fingerprinting can entail, for example, decoding a packet to get a fingerprint (e.g., path history), which is compared to a trace packet. Alternatively or in addition, a fingerprint can be encoded into the source MAC address of a probe message. The fingerprint can be derived from, for example, a stable hash of a cluster (e.g., security zone) name.

Figure 8:
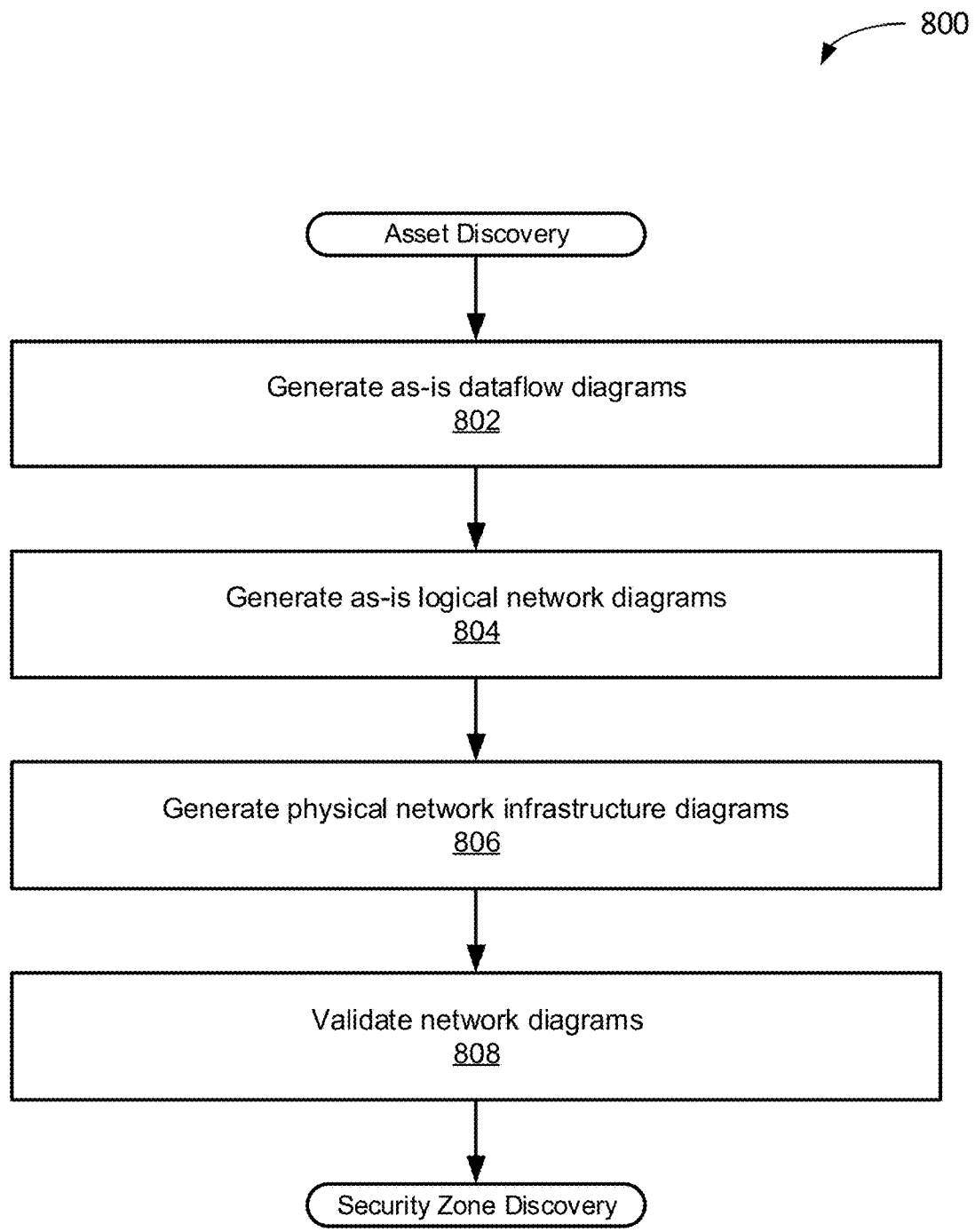
FIG. 8 depicts a flowchart of an example of a method of network discovery.

FIG. 8 depicts a flowchart 800 of an example of a method of network discovery. The flowchart 800 starts at block 802, which includes generation of as-is dataflow diagrams. At block 804, as-is logical network diagrams are generated. At block 806, physical network infrastructure diagrams are generated. At block 808, the network diagrams are validated. Particular systems and methods for generating network diagrams are described in greater detail in a copending U.S. Patent Application titled "Creating, Visualizing, And Simulating A Threat Based Whitelisting Security Policy And Security Zones For Networks", filed Sep. 18, 2017, which is incorporated herein by reference.

Figure 9:
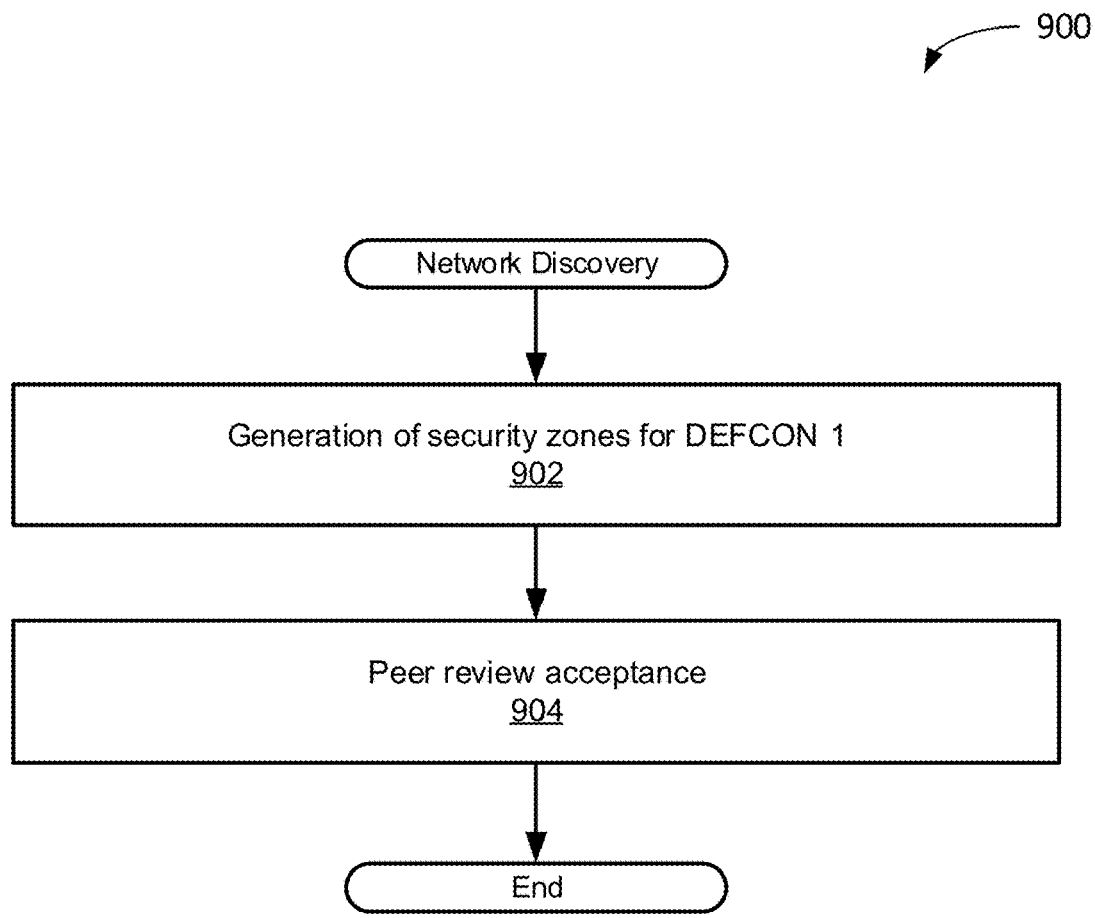
FIG. 9 depicts a flowchart of an example of a method of security zone discovery.

FIG. 9 depicts a flowchart 900 of an example of a method of security zone configuration. The flowchart 900 starts at block 902, which includes generation of security zones for DEFCON 1. Security zones can be generated as a logical clustering of nodes that are related and critical to automation of underlying physical processes. In the example of FIG. 9, the flowchart 900 continues to block 904, which includes peer review acceptance. Particular systems and methods for security zone discovery are described in greater detail in a copending U.S. Patent Application titled "Creating, Visualizing, And Simulating A Threat Based Whitelisting Security Policy And Security Zones For Networks", filed Sep. 18, 2017, which is incorporated herein by reference.

Figure 10:
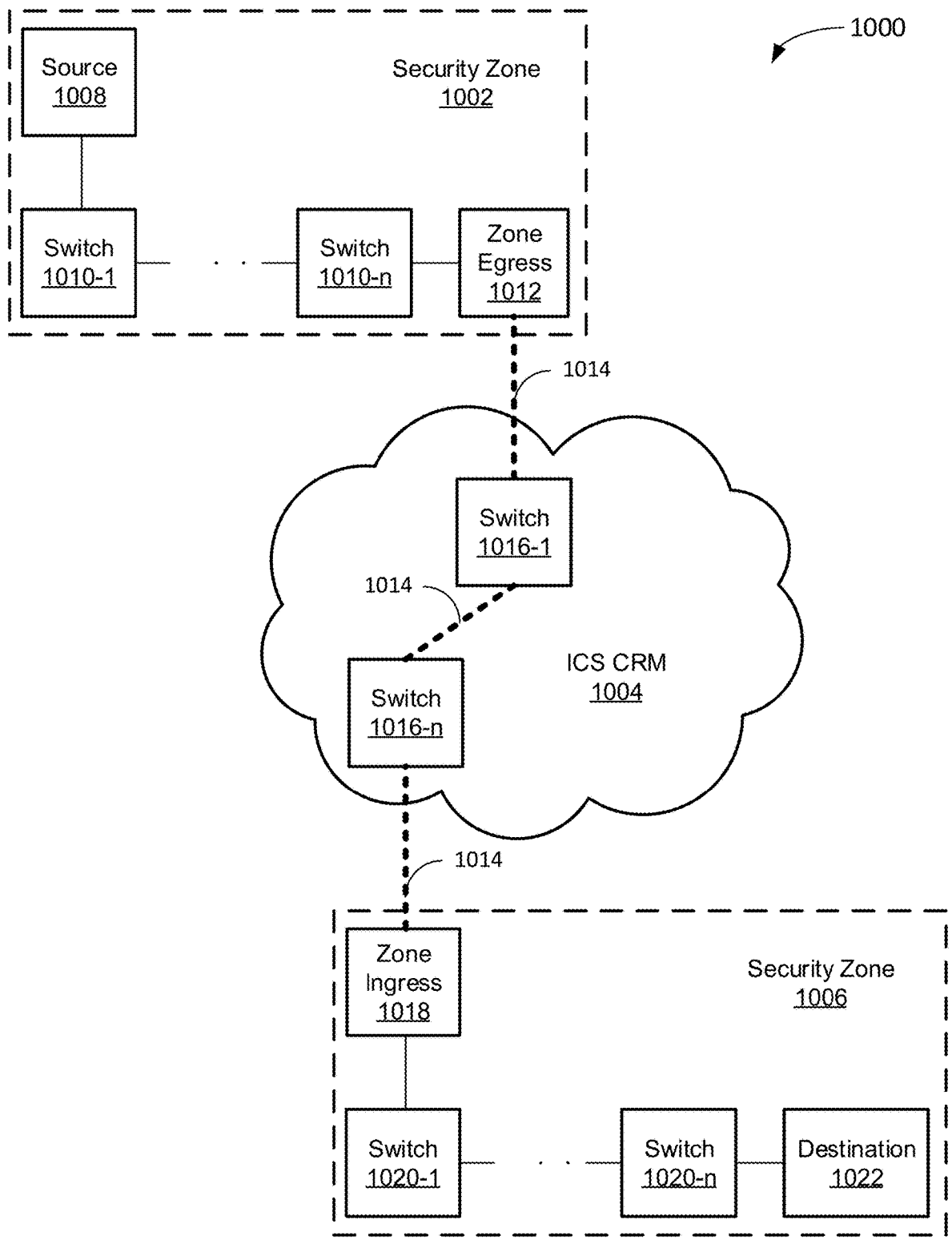
FIG. 10 depicts a diagram of an example of a system having secure conduits between security zones.

FIG. 10 depicts a diagram 1000 of an example ICS having secure conduits between security zones. The diagram 1000 includes a security zone 1002, an ICS CRM 1004, and a security zone 1006. Migrating to a new ICS often involves migrating one part of the system at a time, which leads to scenarios where modern systems are operating on the same network as a 12- or 20-year-old (a typical ICS lifecycle) system and these systems must be able to share data to control the physical process. This characteristic eliminates some options, such as modern encryption capabilities, restricted by the introduction of new hardware and software, and the problems associated with this characteristic can be ameliorated by using techniques described in this paper.

Security zone 1002 includes a source 1008, switches 1010-1 to 1010-$n$ (collectively, switches 1010), and a zone egress 1012. Other assets, such as an HMI, intelligent electronic device (IED), SCADA client, historian, or other applicable asset are omitted for clarity. The source 1008 is intended to represent an asset, such as a PLC, coupled to the switch 1010-1. The source is operationally connected to the zone egress 1012 through the one or more switches 1010. The zone egress 1012 is intended to represent a network port. In the example of FIG. 10, the zone egress 1012 is coupled to the ICS CRM 1004 via a secure conduit 1014. The secure conduit 1014 represents, for example, an encrypted tunnel between the security zone 1002 and the security zone 1006 that, advantageously when implemented in association with techniques described in this paper, has no impact on endpoint host assets of a corresponding ICS.

In the example of FIG. 10, the ICS CRM 1004 includes switches 1016-1 to 1016-$n$ (collectively, switches 1016). Each of the switches 1016 can be implemented in association with a network switch port (not shown), which can be conceptualized as part of the switches 1016. In a specific implementation, the secure conduit 1014 is created directly from the switch 1016-1 to the zone egress 2012 to which assets are connected without any need to rewire. In a specific implementation, the secure conduit 1014 is created virtually without necessitating a change to physical network topology or relocation of assets, such as the switches 1016. In the example of FIG. 10, the switch 1016-$n$ is coupled to the security zone 1006 via the secure conduit 1014. (It may be noted the ICS CRM 1004, depending upon the implementation, could comprise a single switch on the secure conduit 1014, which would make the switch 1016-1 and the switch 1016-$n$ the same switch.)

In the example of FIG. 10, the security zone 1006 includes a zone ingress 1018, switches 1020-1 to 1020-$n$ (collectively, switches 1020), and a destination 1022. In the example of FIG. 10, the zone ingress 1018 is coupled to the ICS CRM 1004 via the secure conduit 1014. The zone ingress 1018 is operationally connected to the destination 1022 through the one or more switches 1020. The destination 1022 is intended to represent an asset, such as a SCADA server, coupled to the switch 1020-$n$. (It may be noted the security zone 1006, depending upon the implementation, could comprise a single switch between the ingress 1018 and the destination 1022, which would make the switch 1020-1 and the switch 1020-$n$ the same switch.)

In an example of operation using components illustrated in the example of FIG. 10, the security zones 1002, 1006 (as well as other security zones, if applicable) and secure conduit 1014 (and other secure conduits, if applicable) are prescribed for secure isolation at different cell/zone levels of assets. Advantageously, the creation of the secure conduit 1014 between the security zones 1002, 1006 is accomplished utilizing the switches 1016 (or, more generally, network infrastructure) as a security fabric. The source 1008 and 1022 may be rather old legacy ICS devices, so establishing device-level encryption may not be an effective option.

Depending upon implementation- or configuration-specific factors, some of the components illustrated in the diagram 1000 may comprise a subset of a network orchestration and security platform, such as the network orchestration and security platform 106 described in association with the example of FIG. 1, or the components may not comprise a subset of a network orchestration and security platform, but can be coupled thereto. In a specific implementation, a network orchestration and security platform (not shown) coupled to the ICS CRM 1004 identifies a physical port of the switch that represents the zone egress 1012 of the source 1008 in the security zone 1002 and a physical port of the switch that represents the zone ingress 1018 of the destination 1022 in the security zone 1006. The network orchestration and security platform sends instructions to the switches 1016 to establish encryption between the zone egress 1012 and the zone ingress 1018.

In a specific implementation, extensions at the switches 1016 support encryption of payload or a tunnel-based capability. This capability can be programmatically applied and is thus dynamic. This capability is useful to help secure legacy industrial networks with legacy ICS devices. For example, the connection between the source 1008, and more generally an end point ICS device, and the zone egress 1012, or more generally a physical port, of the switch 1010-$n$, or more generally a switch coupled to the physical port, is not encrypted and/or tunneled. The protection starts from the point of operational connection of the zone egress 1012 to the switch 1016-1, or more generally a first switch in the ICS CRM 1004, to the destination 1022, or more generally a destination point of connection at the first switch in the ICS CRM 1004. The encryption and/or tunneling is transparent to the source 1008. The last part of the connection of the source 1008 to the switch port is protected by assigning a fingerprint to the end point device. Upon the link down event of the physical port, a new active connection is identified by monitoring the system, e.g., at a network orchestration and security platform. When the connection is active once again, the fingerprint is validated to ensure it is the authorized ICS asset. This method protects against, for example, a "man in the middle" attack (MiM).

Figure 11:
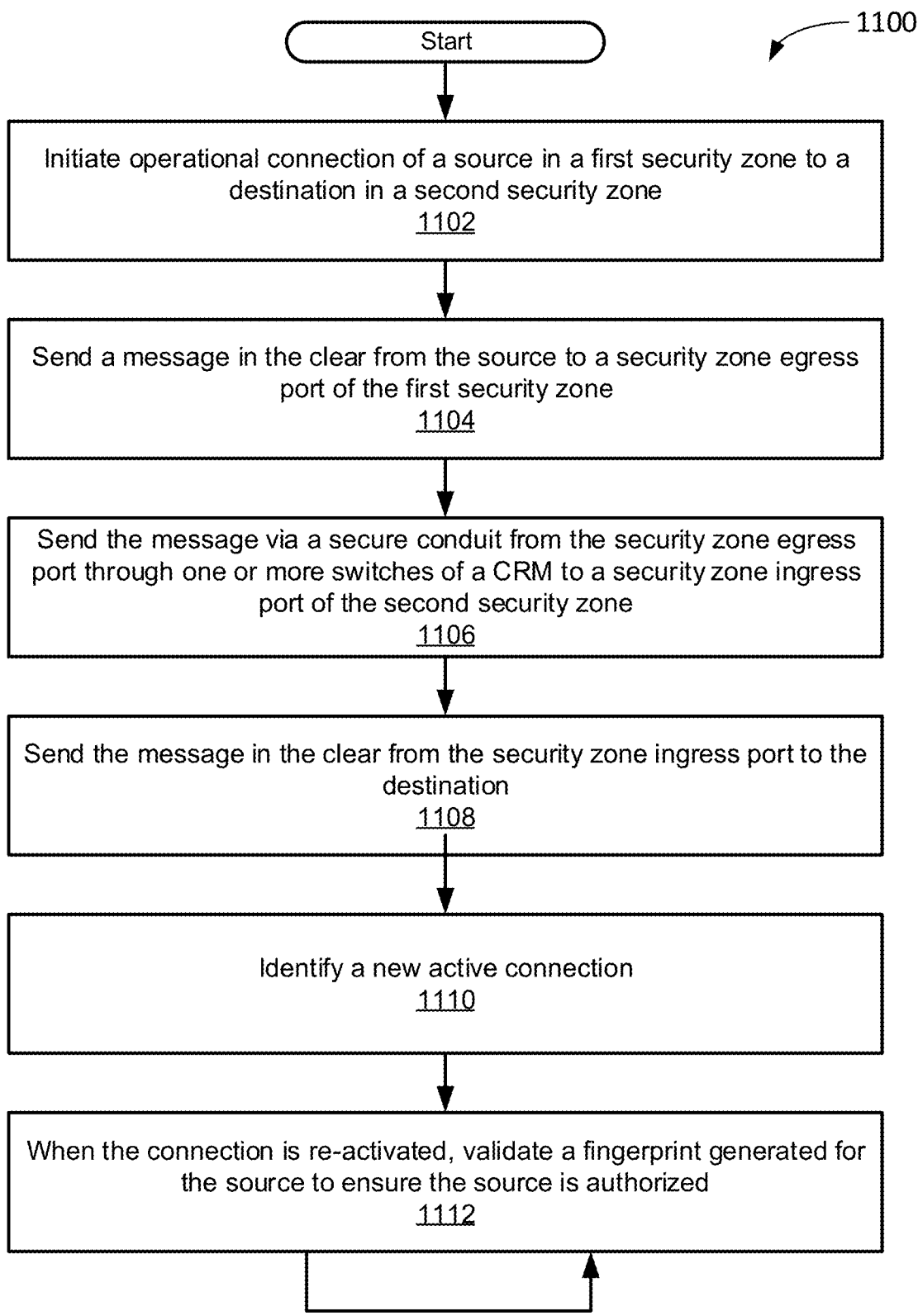
FIG. 11 depicts a flowchart of an example of a method for establishing a connection between a source and destination in a legacy network divided into security zones.

FIG. 11 depicts a flowchart 1100 of an example of a method for establishing a connection between a source and destination in a legacy network divided into security zones. The flowchart 1100 starts at block 1102 with initiate operational connection of a source in a first security zone to a destination in a second security zone. The source and the destination can be referred to collectively as "end point devices."

In the example of FIG. 11, the flowchart 1100 continues to block 1104 with send a message in the clear from the source to a security zone egress port of the first security zone. For the purposes of this example, sending a message in the clear means sending the message without encryption. It should be understood that in this context "encryption" means using an encryption protocol that deviates from a common standard across legacy devices of a network, and should not be confused with encapsulation, segmentation, or other modification of messages in accordance with standards such as IEEE 802.3 or IEEE 802.11. In a specific implementation, the message is also sent in the clear without tunneling.

In the example of FIG. 11, the flowchart 1100 continues to block 1106 with send the message via a secure conduit from the security zone egress port through one or more switches of a CRM to a security zone ingress port of the second security zone. In a specific implementation, the secure conduit includes an encrypted tunnel. An alternative implementation replaces the secure conduit with an encrypted communication channel. Another alternative implementation replaces the secure conduit with a tunnel. The security zone egress port can be characterized as connected to a forwarding device at the edge of both the first security zone and a portion of a network outside of the first security zone, such as a router, switch, access point, gateway, repeater, or the like. The CRM can include an ICS CRM with a number of switches, at least a subset of which are used to form a path from the security zone egress port to the security zone ingress port. Like the security zone egress port, the security zone ingress port can be characterized as connected to a forwarding device at the edge of both the second security zone and a portion of a network outside of the second security zone.

In the example of FIG. 11, the flowchart 1100 continues to block 1108 with send the message in the clear from the security zone ingress port to the destination. Once the message is within the second security zone, the message is sent in the clear, as was described above when the message was sent within the first security zone.

In the example of FIG. 11, the flowchart 1100 continues to block 1110 with identify a new active connection. In a specific implementation, a network orchestration and security platform monitors activity within, e.g., an ICS network. In an SDN-compatible implementation, an SDN controller of the network orchestration and security monitor platform maintains a centralized view of the entire network infrastructure to facilitate identification of new active connections.

In the example of FIG. 11, the flowchart 1100 continues to block 1112 with when the connection is re-activated, validate a fingerprint generated for the source to ensure the source is authorized. Depending upon implementation- and configuration-specific factors, the fingerprint can be generated in association with the source at any point along the flowchart 1100 and used to ensure the sources is an authorized asset. In a specific implementation, the fingerprint is used during second and later utilizations of the source-to-destination path, and may or may not be used in association with the new active connection for authorization purposes.

In the example of FIG. 11, the flowchart 1100 returns to block 1112 for each re-activation of the connection. Of course, conceptually, the flowchart 1100 could actually end if the connection were retired because, for example, the source or destination is modified, replaced, or eliminated, making the connection obsolete.

Figure 12:
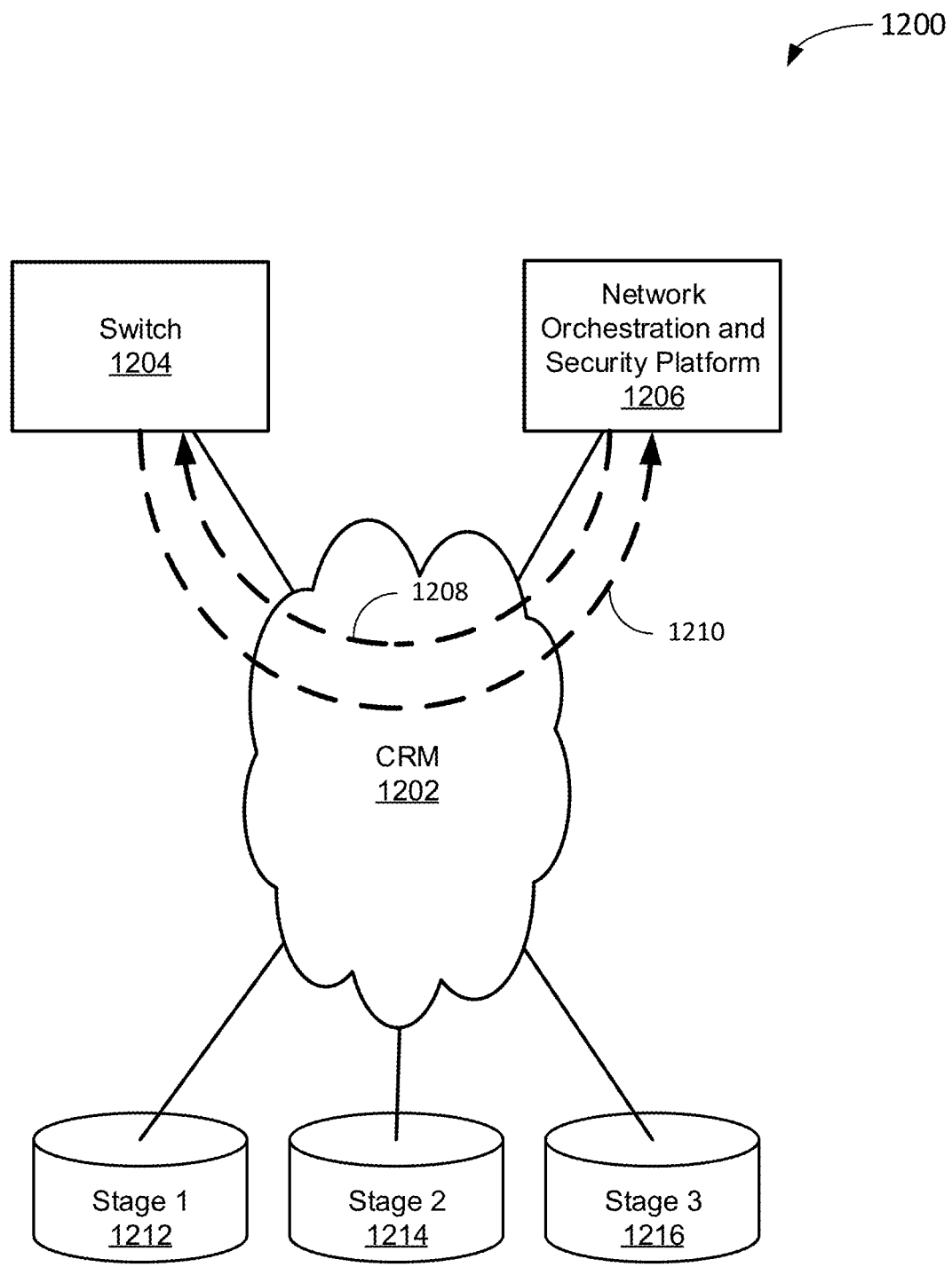
FIG. 12 depicts a diagram of an example of a system for identifying and recording ICS networked assets in a non-intrusive way.

FIG. 12 depicts a diagram 1200 of an example of a system for identifying and recording ICS assets in a non-intrusive way. The diagram 1200 includes a CRM 1202, a switch 1204, a network orchestration and security platform 1206, a stage 1 datastore 1212, a stage 2 datastore 1214, and a stage 3 datastore 1216. It is possible to generate a valuable topology map after categorizing IP and MAC addresses of nodes, identifying conversation peers, protocol, etc. A topology map without context is of limited value because you don't know what the assets are, but the classification of a node as a type is valuable for, e.g., visibility when using techniques described in this paper.

In a specific implementation, the CRM 1202 is an ICS CRM that, without more, lacks the ability to provide visibility of which assets are on the ICS network and what conversations are taking place between those assets. One way to capture network data streams through ports of a switch is to utilize a Switched Port Analyzer (SPAN), but SPAN is not as readily available within industrial network infrastructure as within IT networks and SPAN has deficiencies in security, such as frame timing that is different from original frame timing (the CPU of a switch inserts time into the frames as part of an aggregation function) and reduces the ability to detect time-based attacks and such as SPAN typically having the lowest priority of major switch functions, which can lead to a scenario during peak loading where SPAN is bypassed causing a gap in a data stream. Another way to capture network data streams through ports of a switch is to utilize TAPs, which have the advantage of offering an exact copy of the data stream, but TAPs require many sensors to capture an entire network and out-of-band cabling infrastructure may be necessary to integrate all of the sensors together; plus once all of the sensors have a management network, the streams have to be aggregated. As an alternative, a shadowed recording of patterns of network traffic with minimal network traffic capture can be used to record and identify assets, as is described below.

In the example of FIG. 12, the switch 1204 is intended to represent a switch connected to the CRM 1202 and through the network infrastructure to the network orchestration and security platform 1206. In an SDN-compatible implementation, the switch 1204 is an SDN switch for, e.g., an ICS network and the network orchestration and security platform 1206 includes an SDN controller.

In an example of operation, the network orchestration and security platform 1206 initiates a learning mode for the switch 1204. This mode performs a copy and forward instruction at the switch 1204 for an ingress and/or egress port to a command channel port connected to the network orchestration and security platform 1206.

Figure 13:
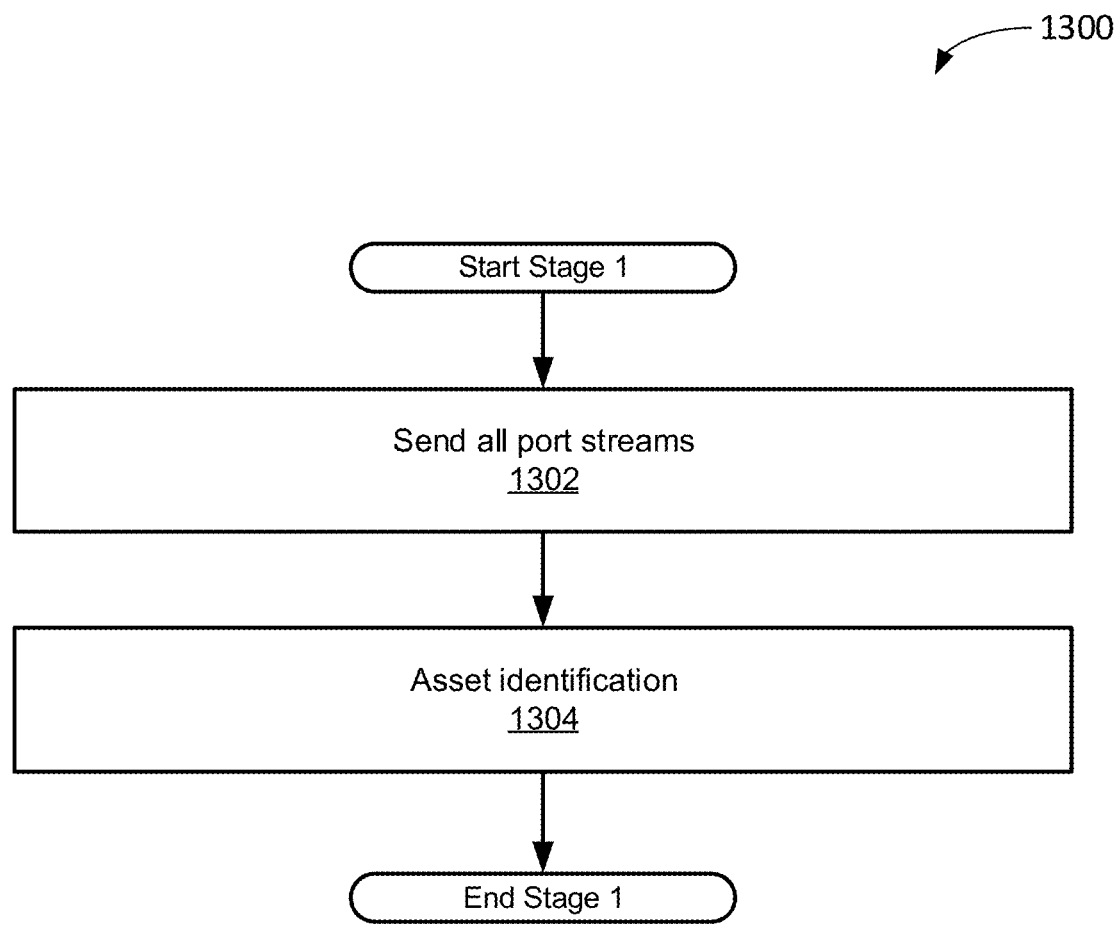
FIG. 13 depicts a flowchart of an example of a "stage 1" process of learning mode to identify assets operationally connected to switch ports included within the scope of the applicable switch data stream.

FIG. 13 depicts a flowchart 1300 of an example of a "stage 1" process of learning mode to identify assets operationally connected to switch ports included within the scope of the applicable switch data stream. The flowchart 1300 starts at block 1302 with send all port streams and continues to block 1304 with asset identification. The identified assets for each switch port represent the completion of the stage 1 learning mode.

Referring once again to the example of FIG. 12, the network orchestration and security platform 1206 builds a filter based upon discovered assets and sends a filtered capture request 1208 to the switch 1204. Using the filter, the switch 1204 captures a data stream for the applicable assets for the applicable physical ports and provides the data stream 1210 to the network orchestration and security platform 1206. In the example of FIG. 12, data associated with stage 1 is stored in the stage 1 datastore 1212.

Figure 14:
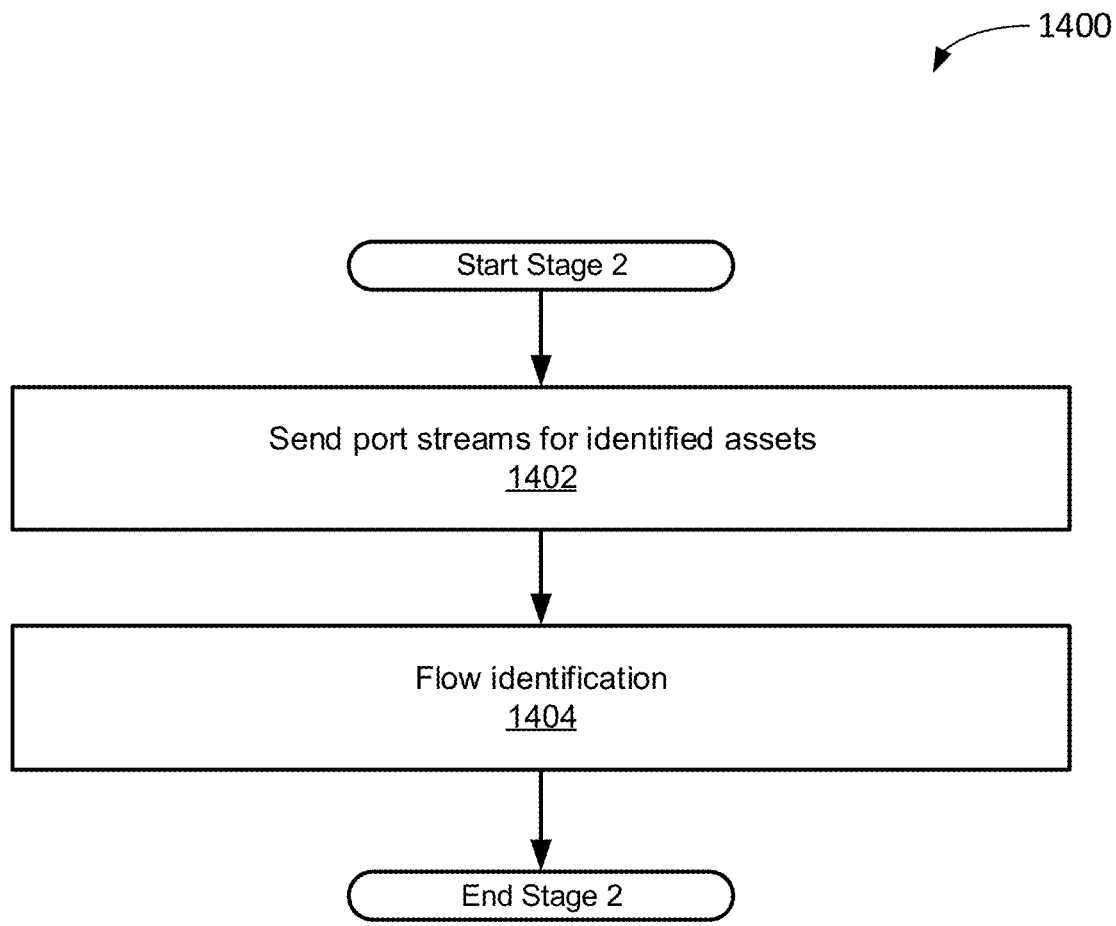
FIG. 14 depicts a flowchart of an example of a "stage 2" process of learning mode to identify flow information for the applicable assets.

FIG. 14 depicts a flowchart 1400 of an example of a "stage 2" process of learning mode to identify flow information for the applicable assets. The flowchart 1400 starts at block 1402 with send port streams for identified assets and continues to block 1404 with flow identification. In a specific implementation, once flow information has been determined based upon a standard deviation threshold, the stage 2 process is complete.

Referring once again to the example of FIG. 12, the network orchestration and security platform 1206 builds a filter based upon discovered assets and discovered flows and sends a filtered capture request 1208 to the switch 1204. Using the filter, the switch 1204 captures a data stream for the applicable assets for the applicable physical ports and provides the data stream 1210 to the network orchestration and security platform 1206. (Note 1: The filtered capture request 1208 and the data stream 1210 are different than those described in association with stage 1, but the same FIG. 12 for the sake of brevity. Note 2: Because the filters become successively more restrictive at each successive stage, the corresponding data streams are smaller at each successive stage.) In the example of FIG. 12, data associated with stage 2, such as flow information, is stored in the stage 2 datastore 1214.

Figure 15:
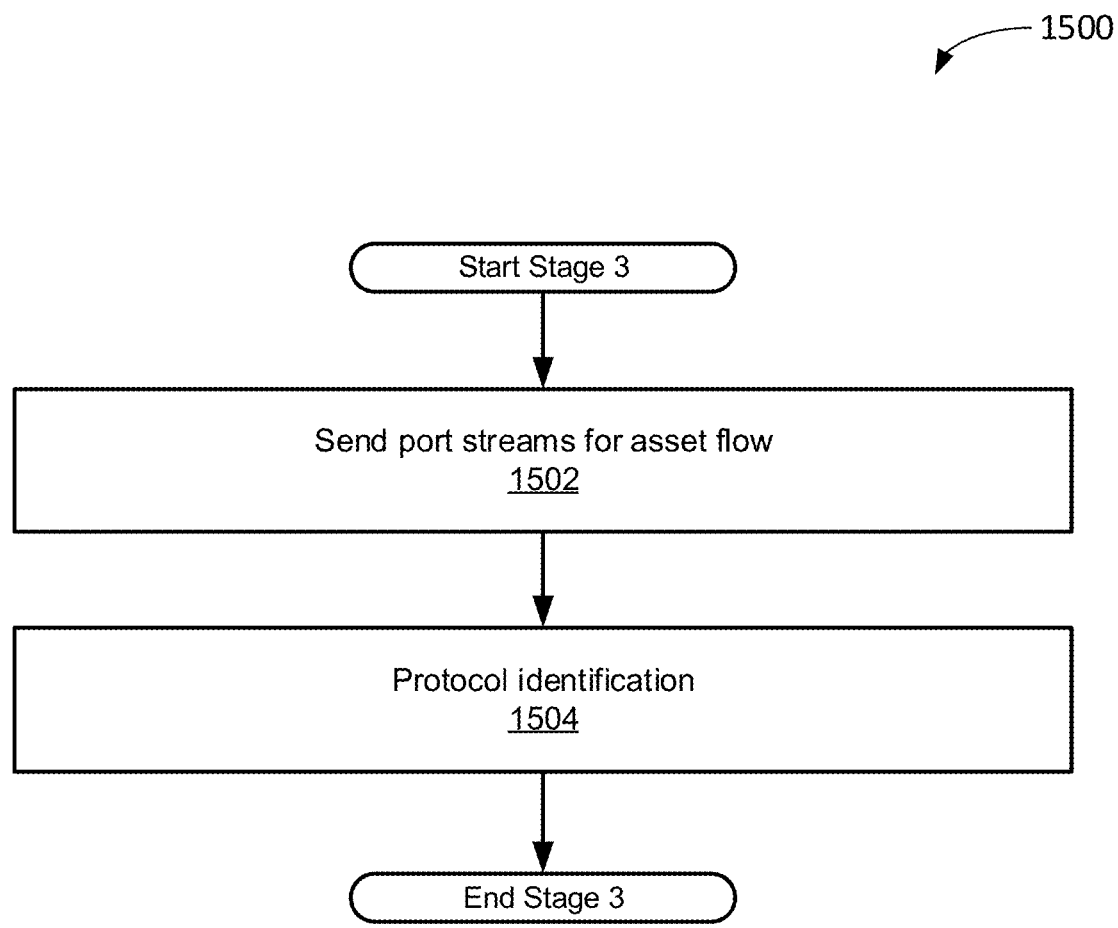
FIG. 15 depicts a flowchart of an example of a "stage 3" process of learning mode to identify protocol information for the applicable assets.

FIG. 15 depicts a flowchart 1500 of an example of a "stage 3" process of learning mode to identify protocol information for the applicable assets. The flowchart 1500 starts at block 1502 with send port streams for asset flow and continues to block 1504 with protocol identification. In a specific implementation, once each flow for each asset has been characterized and typed, the stage 3 process is complete.

Referring once again to the example of FIG. 12, the network orchestration and security platform 1206 builds a command structure based upon the applicable asset, flows, and protocols for the applicable physical ports of the switch 1204 and sends a filtered capture request 1208 to the switch 1204. Using the filter, the switch 1204 captures a data stream for the included assets for the applicable physical ports and provides the data stream 1210 to the network orchestration and security platform 1206. In the example of FIG. 12, data associated with stage 3, such as information regarding each conversation of each flow for each asset that has been characterized and typed, is stored in the stage 3 datastore 1216.

Figure 16:
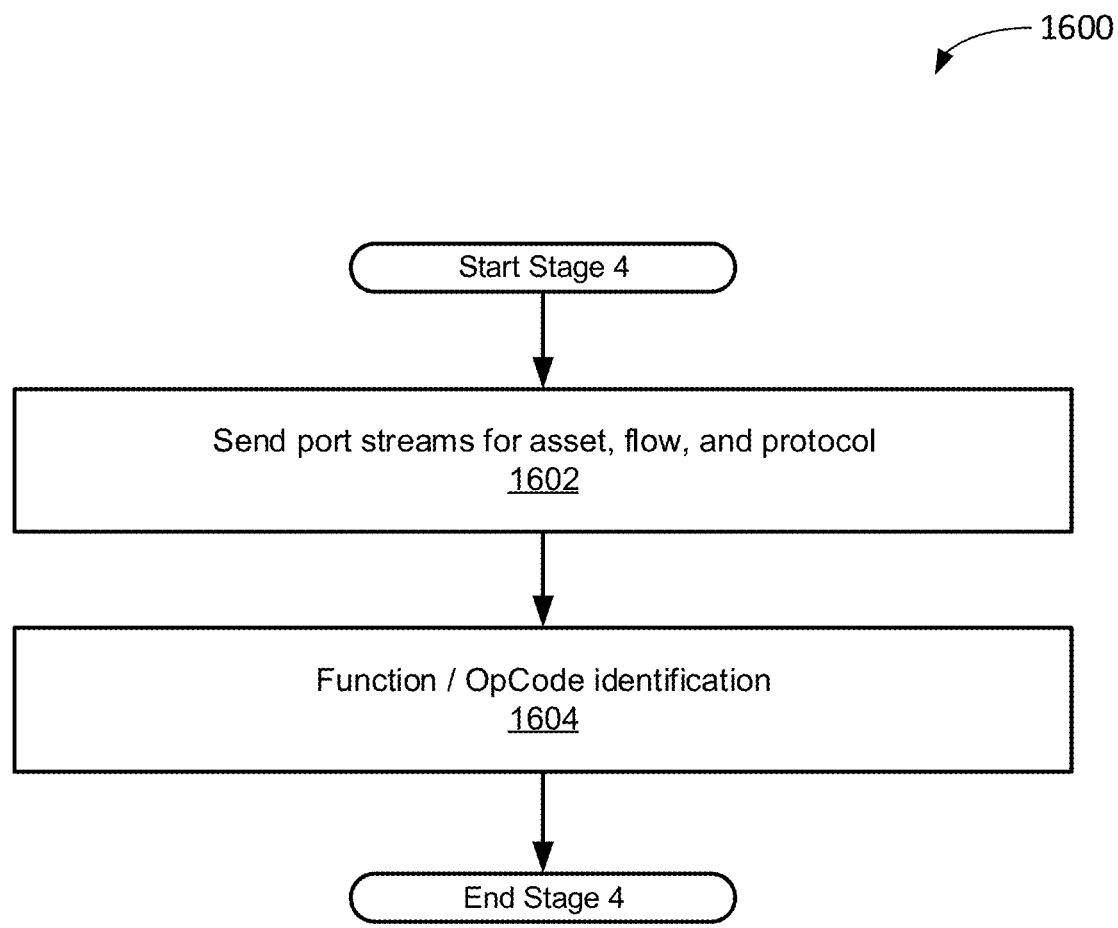
FIG. 16 depicts a flowchart of an example of a "stage 4" process of learning mode to analyze each asset, flow, and protocol used to extract function/OpCodes used within the conversation, using the protocols.

FIG. 16 depicts a flowchart 1600 of an example of a "stage 4" process of learning mode to analyze each asset, flow, and protocol used to extract function/OpCodes used within the conversation, using the protocols. The flowchart 1600 starts at block 1602 with send port streams for asset, flow, and protocol, and continues to block 1604 with function/OpCode identification. In a specific implementation, once a standard threshold deviation has been reached, the stage 4 process is complete.

Referring once again to the example of FIG. 12, the network orchestration and security platform 1206 sends a command 1208 to the switch 1204 to terminate data stream forwarding. The automated staging process reduces the amount of data within the data stream to substantially (or ideally) only what is required for analysis, thus decreasing loading on the switch 1204 as well as the CRM 1202 (e.g., network infrastructure).

Figure 17:
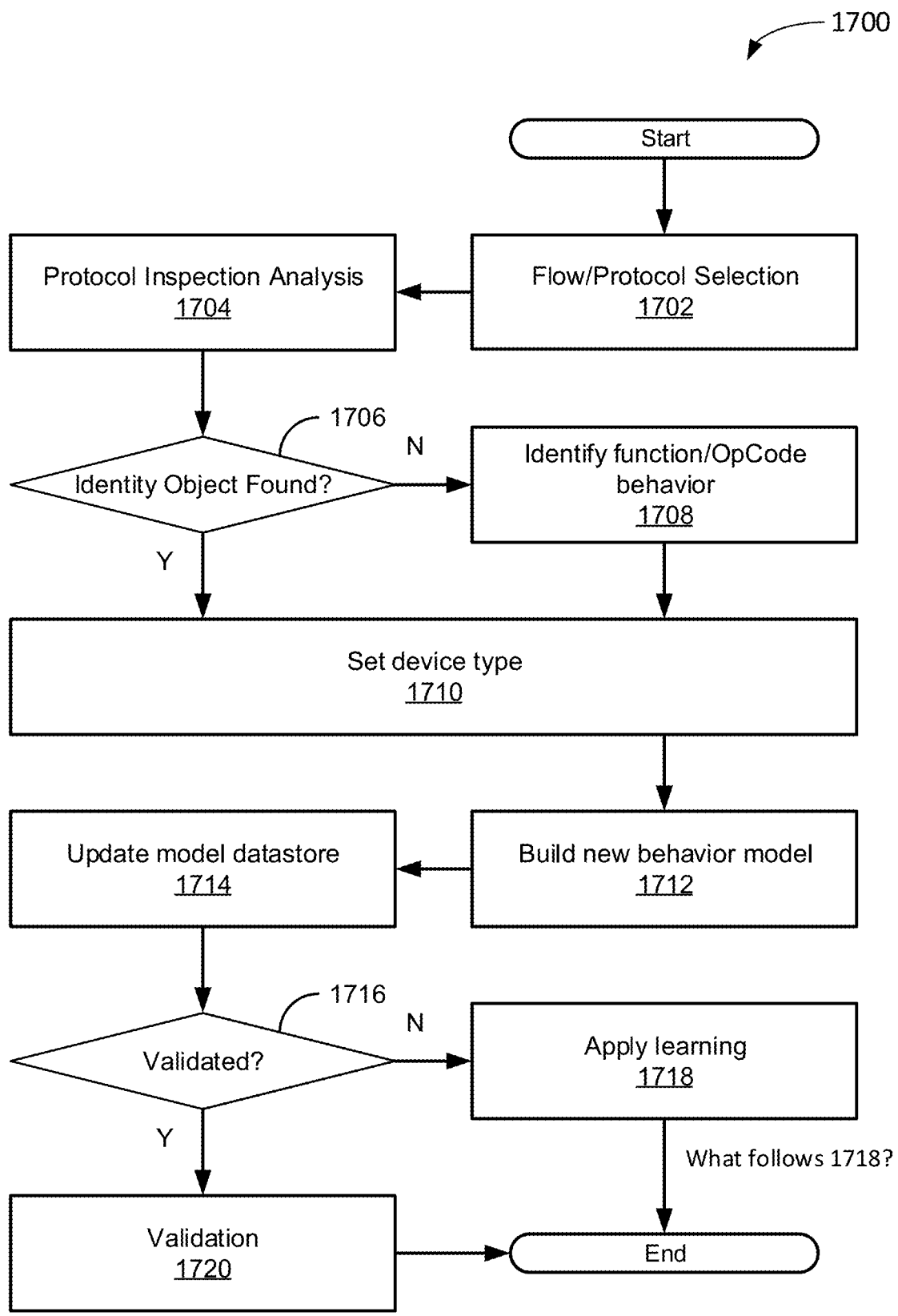
FIG. 17 depicts a diagram of an example of a system for characterizing and classifying networked industrial assets based upon conversation patterns.

FIG. 17 depicts a flowchart 1700 of an example of a method for characterization of an industrial asset at various stages of inspection and analysis. The flowchart 1700 can be conceptually associated with the latter parts of the Learning Mode described previously. The flowchart 1700 starts at block 1702 with flow/protocol selection. In a specific implementation, flow/protocol selection entails identifying a communication flow and a protocol associated therewith. Advantageously, the techniques described in association with FIG. 17 can be accomplished without active scanning, which can be extremely harmful from an environmental, health, or safety perspective in an industrial system because active scanning can adversely impact the industrial system.

In the example of FIG. 17, the flowchart 1700 continues to block 1704 with protocol inspection analysis. In a specific implementation, protocol inspection analysis involves inspecting function/OpCodes to obtain master/server pattern matching, client/slave pattern matching, or pub/sub pattern matching, to name three. The applicable asset communication patterns are stored in a asset communication patterns datastore, which can be updated later during classification.

In the example of FIG. 17, the flowchart 1700 continues to decision point 1706 where it is determined whether an identity object is found. If it is determined an identity object is not found (1706-N), then the flowchart 1700 continues to block 1708 with identify function/OpCode behavior. In a specific implementation, upon identification of function/OpCode behavior, behavior patterns are stored in a behavior patterns datastore, which can be further updated later.

In the example of FIG. 17, the flowchart 1700 continues to block 1710 with set asset type either after block 1708 or if it is determined an identity object is found (1706-Y). In the latter case, block 1708 is skipped.

In the example of FIG. 17, the flowchart 1700 continues to block 1712 with build new behavior model.

In the example of FIG. 17, the flowchart 1700 continues to block 1714 with update model datastore. In a specific implementation, upon building a new behavior model, the asset communication patterns datastore and the behavior pattern datastore are updated.

In the example of FIG. 17, the flowchart 1700 continues to decision point 1716 where it is determined whether the asset associated with the applicable flow is validated. If it is determined the asset associated with the applicable flow is not validated (1716-N), then the flowchart 1700 continues to block 1718 with apply learning. In a specific implementation, applying learning involves updating the asset communication patterns datastore and the behavior patterns datastore.

If, on the other hand, it is determined the asset associated with the applicable flow is validated (1716-Y), then the flowchart 1700 continues to block 1720 with validation. Upon validation, the applicable industrial asset has been characterized and the flowchart 1700 ends.

Figure 18:
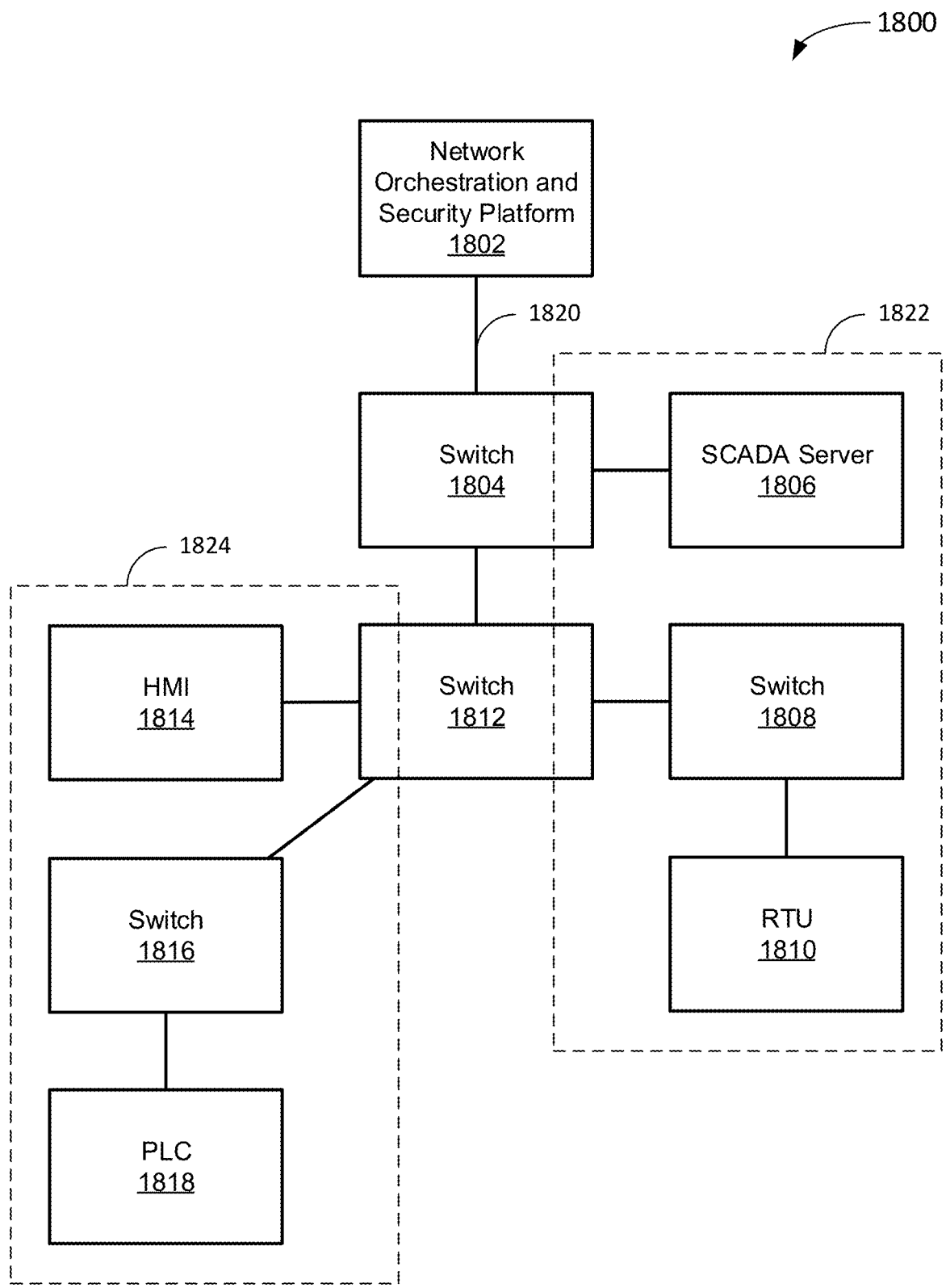
FIG. 18 depicts a flowchart of an example of a method for characterization of an industrial asset at various stages of inspection and analysis.

FIG. 18 depicts a diagram 1800 of an example of a system for characterizing and classifying networked industrial assets based upon conversation patterns. The diagram 1700 includes a network orchestration and security platform 1802, a switch 1804 coupled to the network orchestration and security platform 1802, a SCADA server 1806 coupled to the switch 1804, a switch 1808, an RTU 1810 coupled to the switch 1808, a switch 1812 coupled to the switch 1804 and the switch 1808, an HMI 1814 coupled to the switch 1812, a switch 1816 coupled to the switch 1812, and a PLC 1818 coupled to the switch 1812. Industrial networks that run on Ethernet are sometimes different than those within an enterprise. For example, communication characteristics are deterministic, sessions can last years, and they use industrial protocols. Industrial networking infrastructure often uses industrial, ruggedized devices that are different than those of IT networks. This can create a situation where there is limited or no visibility of assets on the network as well as limited understanding of conversations taking place between assets (e.g., M2M communication). Industrial assets communicate with other assets in a known pattern which is unique for the site and asset's role. By inspecting the network traffic and analyzing the protocol requests and responses, the network orchestration and security platform 1802 identifies the role of each asset, and can utilize other indicators to define manufacturer and software/firmware revision levels.

In an example of operation, the network orchestration and security platform 1802 communicates with the switch 1804 over a command channel 1820. A characteristic of a communications protocol appropriate for the command channel 1820 is to give access to a forwarding plane of a switch. One applicable communications protocol, provided by way of example, is OpenFlow. The SCADA/RTU channels 1822 could use, for example, Modbus TCP, a serial communications protocol for use with PLCs that is commonly used to connect industrial electronic devices. The PLC/HMI channels 1824 could use, for example, CIP Ethernet/IP, an industrial network protocol that adapts the Common Industrial Protocol (CIP) to standard Ethernet that is commonly used in a range of industries including factory, hybrid, and process.

Upon the deployment of a new switch to the network, a training mode is enabled which allows the network orchestration and security platform 1802 to learn the flows needed, and set configurations for the switch. During this process, the switch is forwarding the data stream from its physical ports to the network orchestration and security platform 1802, as described above with reference to FIGS. 12-16.

Figure 19:
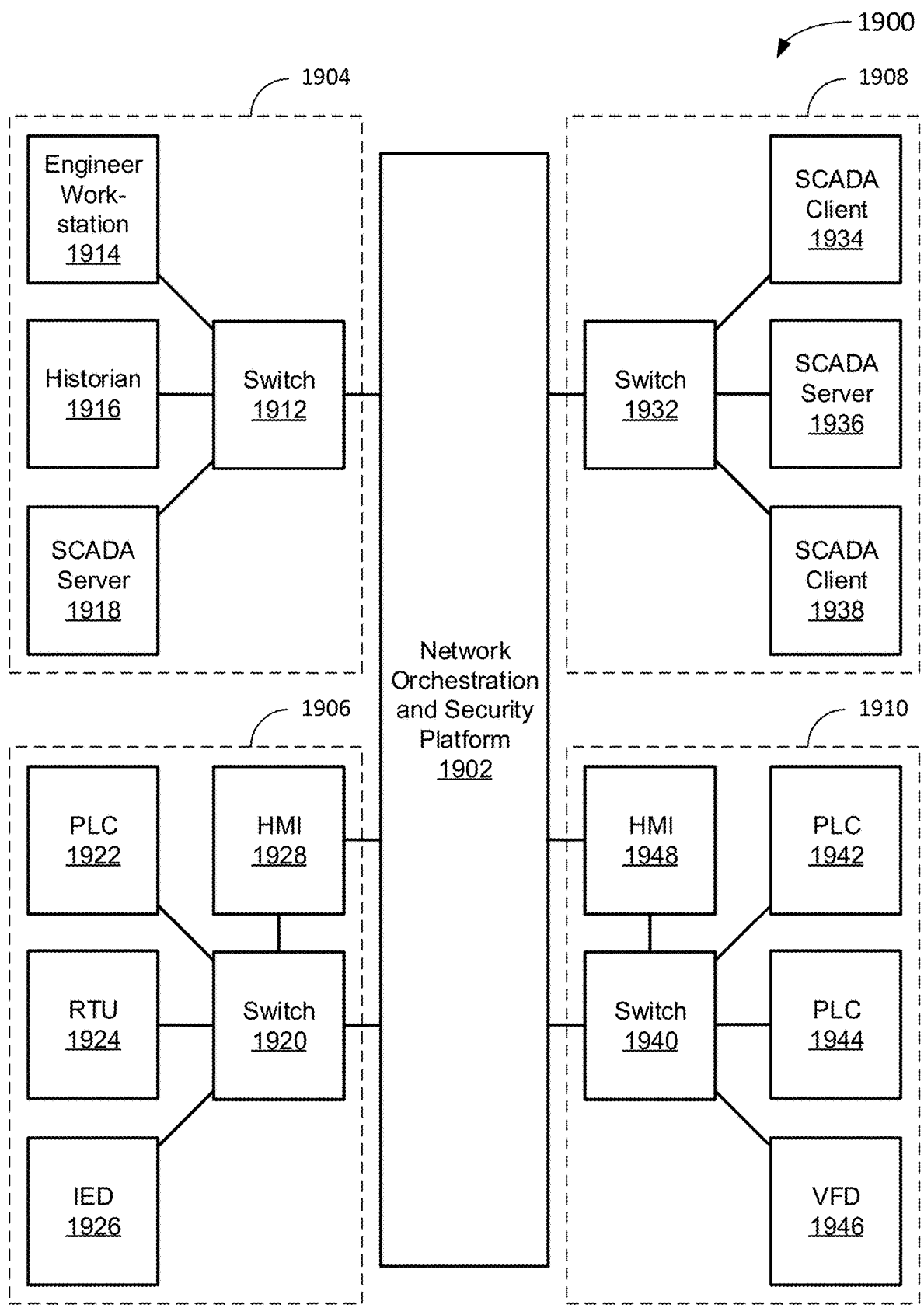
FIG. 19 depicts a diagram of an example of a system for generating security zones for industrial control system networked assets based upon conversation characteristics and patterns.

FIG. 19 depicts a diagram 1900 of an example of a system for generating security zones for industrial control system networked assets based upon conversation characteristics and patterns. The diagram 1900 includes a network orchestration and security platform 1902, a logical group 1904, a logical group 1906, a logical group 1908, and a logical group 1910. For illustrative purposes, the logical groups have been populated with components, such as, in logical group 1904, a switch 1912, an engineering workstation 1914, a historian 1916, and a SCADA server 1918; in logical group 1906, a switch 1920, a PLC 1922, an RTU 1924, an IED 1926, and an HMI 1928; in logical group 1908, a switch 1932, a SCADA client 1934, a SCADA server 1936, and a SCADA client 1938; in logical group 1910, a switch 1940, a PLC 1942, a PLC 1944, a VFD 1946, and an HMI 1948.

ISA/IEC 62443 is a series of standard, technical reports, and related information that define procedures for implementing electronically secure Industrial Automation and Control Systems (IACS). The documents were originally referred to as ANSI/ISA-99 or ISA99 standards as they were created by the International Society for Automation (ISA) and publicly released as American National Standards Institute (ANSI) documents, and in 2010 renumbered to be the ANSI/ISA-26443 series. This change was intended to align the ISA and ANSI document numbering with the corresponding International Electrotechnical Commission (IEC) standards, and is regarded as one of the most complete standards for securing industrial control systems. The documents as of the time of this filing are incorporated by reference herein, including Group 1: General (ISA-26443-1-1, ISA-TR62443-1-2, ISA-62443-1-3, ISA-62443-1-4), Group 2: Policy and Procedure (ISA-62443-2-1, ISA-62443-2-2), ISA-TR62443-2-3, ISA-62443-2-4), Group 3: System Integrator (ISA-TR62443-3-1, ISA-62443-3-2, ISA-62443-3-3), and Group 4: Component Provider (ISA-62443-4-1, ISA-62443-4-2), some of which are currently under development, are widely accepted due in part to the fact it is an international standard, but, particularly for industrial networks, implementing various capabilities available under the standard requires a time-consuming manual effort. In a specific implementation, using clustering of assets based on communication affinity facilitates modeling of security zones based on trust with asset peers, creating logical process groups. Advantageously, this clustering approach provides an extra level of trust zones over standard secure asset authentication schemes.

Referring once again to the example of FIG. 19, the communication affinity between hosts is analyzed to divide the various assets into the logical groups 1904, 1906, 1908, 1910. The cyclical and acyclic communication patterns are analyzed to determine critical communication partners that represent a cluster. The Function/OpCodes are then analyzed as the function of assets can be determined and characterized, as was described previously in this paper. The cluster is determined to be a logical process group as each node in the cluster provides a key function in controlling the physical process. Because each node is necessary for function of the complete physical process, the logical groups 1904, 1906, 1908, 1910 (clusters) are considered trust zones. In a specific implementation, the security zones are presented by the network orchestration and security platform 1902 in a visual manner that represents a tremendous efficiency increase in establishment and design of security zones.

Figure 20:
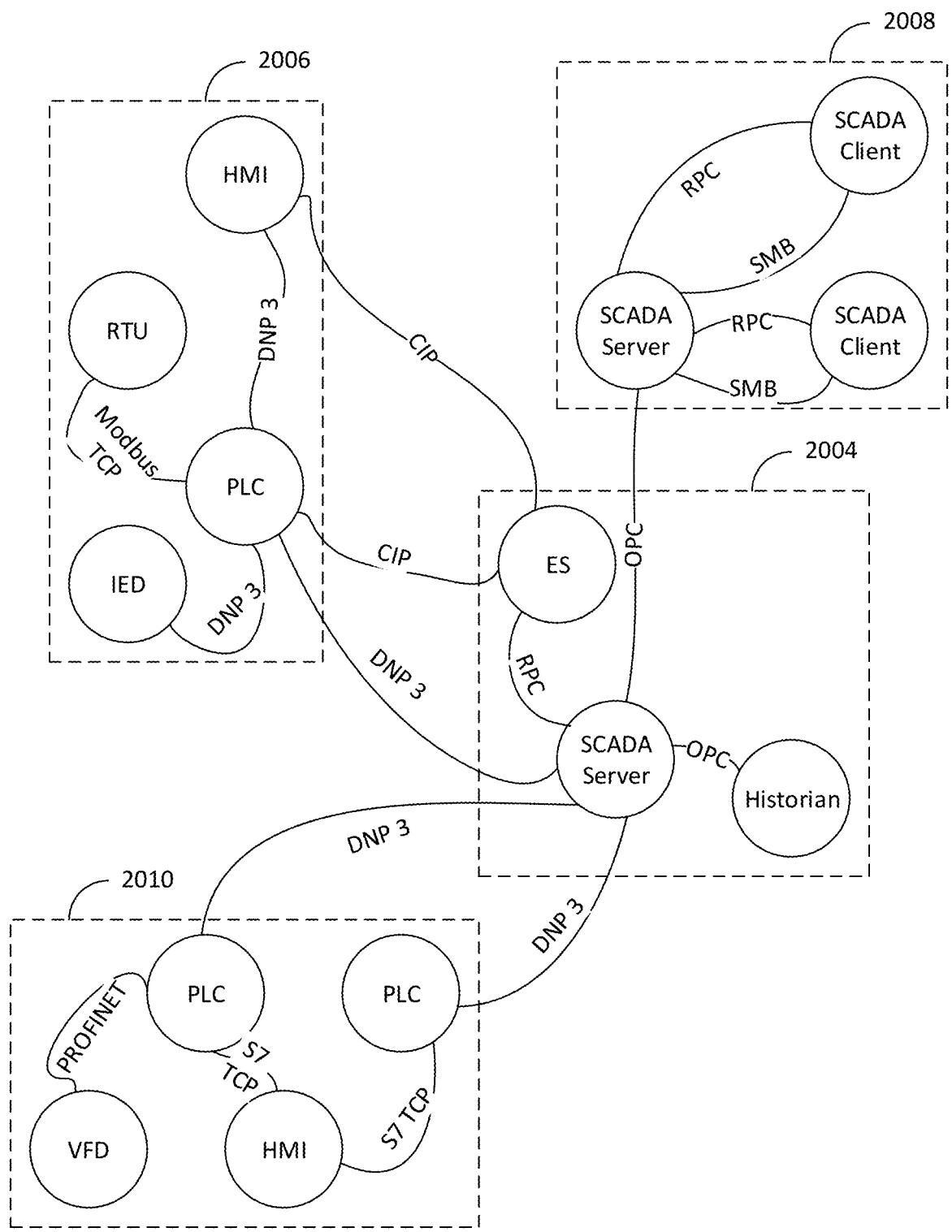
FIG. 20 depicts a diagram of the logical groups of the example of FIG. 19 based upon affinity of communication and function analysis.

FIG. 20 depicts a diagram 2000 of the logical groups 1904, 1906, 1908, 1910 of the example of FIG. 19 based upon affinity of communication and function analysis. The logical groups 2004, 2006, 2008, 2010 correspond to the logical groups 1904, 1906, 1908, 1910. Also illustrated are communication protocols employed between the various assets provided by way of example but not limitation in the logical groups 2004, 2006, 2008, 2010.

These and other examples provided in this paper are intended to illustrate but not necessarily to limit the described implementation. As used herein, the term "implementation" means an implementation that serves to illustrate by way of example but not limitation. The techniques described in the preceding text and figures can be mixed and matched as circumstances demand to produce alternative implementations.

I claim:

1. A method comprising:
    initiating, via a controller of an industrial control system (ICS) network, an operational connection of a source in a first security zone of the ICS network to a destination in a second security zone of the ICS network;
    sending a message in the clear from the source to a security zone egress port of a first forwarding device of the first security zone, wherein the first forwarding device is communicatively coupled to the controller;
    sending the message via a secure conduit from the security zone egress port to a security zone ingress port of a second forwarding device of the second security zone, wherein the second forwarding device is communicatively coupled to the controller, wherein the secure conduit comprises an encryption or tunneling that is transparent to the source;
    sending the message in the clear from the security zone ingress port of the second forwarding device to the destination; and
    when the operational connection is re-activated, validating a fingerprint generated for the source to ensure the source is authorized,
    wherein the first security zone and the second security zone represent a logical grouping of trust of assets in the ICS network in which communications received by an asset from assets within the same security zone are trusted and communications received by an asset from assets outside the same security zone are untrusted.

2. The method of claim 1, comprising sending the message via the secure conduit through one or more switches of the ICS network.

3. The method of claim 1, comprising generating the fingerprint for the source.

4. The method of claim 1, wherein sending the message in the clear means sending the message without encryption.

5. The method of claim 4, wherein the secure conduit comprises an encrypted tunnel between the first security zone and the second security zone, wherein the encrypted tunnel is transparent to the source.

6. The method of claim 1, wherein sending the message in the clear means sending the message without tunneling.

7. The method of claim 1, comprising identifying the operational connection as a new active connection.

8. The method of claim 1, comprising each time the active connection is re-activated, validating the fingerprint generated for the source to ensure the source is authorized.

9. The method of claim 1, further comprising:
identifying, via the controller, a physical port of the first forwarding device that represents the security zone egress port of the source;
identifying, via the controller, a physical port of the second forwarding device that represents the security zone ingress port of the destination; and
sending instructions from the controller to the first and second forwarding devices to establish encryption between the egress port and the ingress port.

10. The method of claim 1, wherein a connection from the source to the security zone egress port is protected using the fingerprint.

11. The method of claim 1, where the operational connection is re-activated via the controller monitoring for a new active connection after a link down event.

12. The method of claim 1, further comprising: creating, via the controller, the first security zone and the second security zone of the ICS network.

13. The method of claim 1, wherein each of the first security zone and the second security zone represents a logical grouping of assets whose function is related to automation of a related physical process.

14. A system comprising:
an industrial control system (ICS) network, the ICS network comprising:
a first security zone, the first security zone comprising a first forwarding device;
a second security zone, the second security zone comprising a second forwarding device; and
a controller communicatively coupled to the first forwarding device and the second forwarding device, the controller configured to generate a fingerprint to ensure a source in the first security zone is authorized to send to a destination in the second security zone;
wherein, in operation:
the controller initiates an operational connection from the source to the destination;
the source sends a message in the clear to a security zone egress port of the first forwarding device of the first security zone;
the security zone egress port sends the message via a secure conduit to a security zone ingress port of the second forwarding device of the second security zone, wherein the secure conduit comprises an encryption or tunneling that is transparent to the source; and
the security zone ingress port sends the message in the clear to the destination;
wherein, when the operational connection is re-activated, the fingerprint is validated,
wherein the first security zone and the second security zone represent a logical grouping of trust of assets in the ICS network in which communications received by an asset from assets within the same security zone are trusted and communications received by an asset from assets outside the same security zone are untrusted.

15. The system of claim 14, wherein the message is sent via the secure conduit through one or more switches of the ICS network.

16. The system of claim 14, wherein sending the message in the clear means sending the message without encryption.

17. The system of claim 14, wherein sending the message in the clear means sending the message without tunneling.

18. The system of claim 14, wherein the controller identifies the operational connection as a new active connection.

19. The system of claim 14, wherein each time the active connection is re-activated, the fingerprint is validated to ensure the source is authorized.

20. A non-transitory computer readable medium having executable instructions stored that, when executed by a processor, perform operations comprising:
initiating, via a controller of an industrial control system (ICS) network, an operational connection of a source in a first security zone of the ICS network to a destination in a second security zone of the ICS network;
sending a message in the clear from the source to a security zone egress port of a first forwarding device of the first security zone, wherein the first forwarding device is communicatively coupled to the controller;
sending the message via a secure conduit from the security zone egress port to a security zone ingress port of a second forwarding device of the second security zone, wherein the second forwarding device is communicatively coupled to the controller, wherein the secure conduit comprises an encryption or tunneling that is transparent to the source;
sending the message in the clear from the security zone ingress port of the second forwarding device to the destination; and
when the operational connection is re-activated, validating a fingerprint generated for the source to ensure the source is authorized,
wherein the first security zone and the second security zone represent a logical grouping of trust of assets in the ICS network in which communications received by an asset from assets within the same security zone are trusted and communications received by an asset from assets outside the same security zone are untrusted.

* * * * *